(12) United States Patent
Sun

(10) Patent No.: US 12,341,957 B2
(45) Date of Patent: Jun. 24, 2025

(54) ENCODING METHOD, ELECTRONIC DEVICE, COMMUNICATION SYSTEM, STORAGE MEDIUM, AND PROGRAM PRODUCT

(71) Applicant: Huawei Technologies Co., Ltd., Shenzhen (CN)

(72) Inventor: Wei Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/260,895

(22) PCT Filed: Jan. 5, 2022

(86) PCT No.: PCT/CN2022/070199
§ 371 (c)(1),
(2) Date: Jul. 10, 2023

(87) PCT Pub. No.: WO2022/148356
PCT Pub. Date: Jul. 14, 2022

(65) Prior Publication Data
US 2024/0073415 A1    Feb. 29, 2024

(30) Foreign Application Priority Data
Jan. 8, 2021    (CN) .......................... 202110025066.6

(51) Int. Cl.
*H04N 7/12*    (2006.01)
*H04N 19/114*    (2014.01)
*H04N 19/115*    (2014.01)

(52) U.S. Cl.
CPC ......... *H04N 19/114* (2014.11); *H04N 19/115* (2014.11)

(58) Field of Classification Search
CPC .............. H04N 19/114; H04N 19/115; H04N 21/21805; H04N 21/2662; H04N 21/4223;
(Continued)

(56) References Cited

U.S. PATENT DOCUMENTS 7,486,732 B1    2/2009    Ducharme et al.
8,249,141 B1    8/2012    Harris et al.
(Continued)

FOREIGN PATENT DOCUMENTS

CN    1711768 A    12/2005
CN    101370140 A    2/2009
(Continued)

OTHER PUBLICATIONS

Hong Wei et al.,"Application Research of Adaptive Streaming Media Technology in CDN," 2012, 8 pages.

*Primary Examiner* — Gims S Philippe
(74) *Attorney, Agent, or Firm* — Conley Rose, P.C.

(57) ABSTRACT

An encoding method includes that a first device determines an I-frame position of a first image stream and an I-frame position of a second image stream based on a first resolution, a second resolution, an I-frame time interval, and a frame rate; the first device encodes the first image stream based on the I-frame position of the first image stream to obtain a first compressed stream; the first device encodes the second image stream based on the I-frame position of the second image stream to obtain a second compressed stream; and the first device sends the first compressed stream and the second compressed stream to the second device.

20 Claims, 18 Drawing Sheets

(58) Field of Classification Search
CPC ............. H04N 21/44; H04N 21/44245; H04N 21/6543; H04N 21/8455; H04N 7/181; H04N 19/85

See application file for complete search history.

(56) References Cited

U.S. PATENT DOCUMENTS

| | | | | |
|---|---|---|---|---|
| 11,004,176 | B1* | 5/2021 | Newman | H04N 19/80 |
| 11,539,799 | B2* | 12/2022 | Gay | H04W 4/06 |
| 11,601,557 | B2* | 3/2023 | Pring | G06F 13/1673 |
| 11,635,767 | B2* | 4/2023 | Nisenzon | G05D 1/0274 |
| | | | | 701/28 |
| 2006/0018379 | A1 | 1/2006 | Cooper | |
| 2014/0043495 | A1* | 2/2014 | Bateman | H04N 23/64 |
| | | | | 348/207.11 |
| 2015/0085132 | A1 | 3/2015 | Bekiares et al. | |
| 2017/0264866 | A1 | 9/2017 | Li et al. | |
| 2018/0131987 | A1 | 5/2018 | Kim et al. | |
| 2018/0359499 | A1 | 12/2018 | Mavlankar et al. | |
| 2021/0400233 | A1 | 12/2021 | Li | |

FOREIGN PATENT DOCUMENTS

| | | |
|---|---|---|
| CN | 102202210 A | 9/2011 |
| CN | 102355577 B | 9/2013 |
| CN | 102946570 B | 3/2015 |
| CN | 105306959 A | 2/2016 |
| CN | 105830445 A | 8/2016 |
| CN | 106572352 A | 4/2017 |
| CN | 107277430 A | 10/2017 |
| CN | 109819262 A | 5/2019 |
| CN | 110999294 A | 4/2020 |
| CN | 111163297 A | 5/2020 |
| CN | 111447409 A | 7/2020 |
| WO | 2020133465 A1 | 7/2020 |

* cited by examiner

ENCODING METHOD, ELECTRONIC DEVICE, COMMUNICATION SYSTEM, STORAGE MEDIUM, AND PROGRAM PRODUCT

CROSS-REFERENCE TO RELATED APPLICATIONS

This is a U.S. National Stage of International Patent Application No. PCT/CN2022/070199 filed on Jan. 5, 2022, which claims priority to Chinese Patent Application No. 202110025066.6 filed on Jan. 8, 2021. Both of the aforementioned applications are hereby incorporated by reference in their entireties.

TECHNICAL FIELD

Embodiments of this application relate to the field of terminal technologies, and in particular, to an encoding method, an electronic device, a communication system, a storage medium, and a program product.

BACKGROUND

When a local device needs to obtain a plurality of image streams by using a remote device, the local device may control, by using a network, one remote device to enable a plurality of cameras, and the remote device sends image streams captured by the cameras to the local device, so that a user can view, on the local device, the image streams captured by the plurality of cameras on the remote device. Alternatively, the local device may control, by using a network, a plurality of remote devices to turn on cameras, and the plurality of remote devices send the captured image streams to the local device, so that a user can view, on the local device, the image streams captured by the plurality of remote devices.

However, a data amount of each image stream is large, and a time used for transmitting the plurality of image streams to the local device is relatively long. As a result, a delay of an image displayed by the local device is relatively high.

SUMMARY

Embodiments of this application provide an encoding method, an electronic device, a communication system, a storage medium, and a program product, to resolve a delay problem caused by a relatively long transmission time of a plurality of image streams.

According to a first aspect, an embodiment of this application provides an encoding method, applied to a communication system, where the communication system includes a first device and a second device, and the first device includes a first camera and a second camera. The method includes:

the second device sends a first instruction to the first device;

the first device configures a first resolution and a second resolution according to the first instruction; the first device controls the first camera and the second camera to capture images; the first device processes an image stream captured by the first camera to obtain a first image stream, where a resolution of the first image stream is the first resolution; the first device processes an image stream captured by the second camera to obtain a second image stream, where a resolution of the second image stream is the second resolution; the first device determines an I-frame position of the first image stream and an I-frame position of the second image stream based on the first resolution, the second resolution, an I-frame time interval, and a frame rate; the first device encodes the first image stream based on the I-frame position of the first image stream to obtain a first compressed stream; the first device encodes the second image stream based on the I-frame position of the second image stream to obtain a second compressed stream; and the first device sends the first compressed stream and the second compressed stream to the second device.

Because the first device separately compresses the two image streams, a data amount of the obtained two compressed streams are far less than a data amount of the corresponding image streams, a time used for transmitting the two compressed streams to the second device is relatively short, and after receiving the two compressed streams, the second device decodes the two compressed streams to obtain corresponding image streams, thereby resolving a delay problem caused by a long transmission time of the plurality of image streams. In addition, before separately compressing the two image streams, the first device calculates I-frame positions of the two image streams based on resolutions, and generates I frames at corresponding positions for each image stream, so that the I-frames in each of the two image streams are evenly distributed, thereby avoiding a picture jitter problem caused by an instantaneous increase of the data amount when the I-frames are concurrent.

According to the encoding method provided in the first aspect, the first device is also referred to as a remote device in the embodiments of this application, and the second device is also referred to as a local device in the embodiments of this application.

In a possible implementation, the I-frame position is a frame sequence number of an I frame; and that the first device determines an I-frame position of the first image stream and an I-frame position of the second image stream based on the first resolution, the second resolution, an I-frame time interval, and a frame rate includes: the first device uses a frame sequence number of the first frame of image in the first image stream as a frame sequence number of the first I frame in the first image stream, and uses a frame sequence number of the first frame of image in the second image stream as a frame sequence number of the first I frame in the second image stream; the first device determines an I-frame position weight of the first image stream and an I-frame position weight of the second image stream based on the first resolution and the second resolution; and the first device determines a frame sequence number of an $n^{th}$ I frame in the first image stream and a frame sequence number of an $n^{th}$ I frame in the second image stream based on the I-frame position weight of the first image stream, the I-frame position weight of the second image stream, the I-frame time interval, and the frame rate, where n is greater than or equal to 2.

In a possible implementation, that the first device determines a frame sequence number of an $n^{th}$ I frame in the first image stream and a frame sequence number of an $n^{th}$ I frame in the second image stream based on the I-frame position weight of the first image stream, the I-frame position weight of the second image stream, the I-frame time interval, and the frame rate includes: the first device determines a frame sequence number of a second I frame in the first image stream; the first device determines a frame sequence number of a second I frame in the second image stream based on the I-frame position weight of the first image stream, the I-frame position weight of the second image stream; the frame sequence number of the second I frame in the first image stream, the I-frame time interval, and the frame rate; the first device determines a frame sequence number of an $m^{th}$ I frame in the first image stream based on the frame sequence number of the second I frame in the first image stream, the I-frame time interval, and the frame rate, where m is greater than or equal to 3; and the first device determines a frame sequence number of an $m^{th}$ I frame in the second image stream based on the frame sequence number of the second I frame in the second image stream, the I-frame time interval, and the frame rate, where m is greater than or equal to 3.

In a possible implementation, that the first device determines an I-frame position weight of the first image stream and an I-frame position weight of the second image stream based on the first resolution and the second resolution includes: the first device determines the I-frame position weight of the first image stream by using the following formula:

$$W_1 = \frac{S_1}{S_1 + S_2}$$

where $W_1$ is the I-frame position weight of the first image stream, $S_1$ is the first resolution, and $S_2$ is the second resolution; and the first device determines the I-frame position weight of the second image stream by using the following formula:

$$W_2 = \frac{S_2}{S_1 + S_2}$$

where $W_2$ is the I-frame position weight of the second image stream, $S_1$ is the first resolution, and $S_2$ is the second resolution.

In a possible implementation, that the first device determines a frame sequence number of a second I frame in the second image stream based on the I-frame position weight of the first image stream, the I-frame position weight of the second image stream, the frame sequence number of the second I frame in the first image stream, the I-frame time interval, and the frame rate includes: the first device determines the frame sequence number of the $m^{th}$ I frame in the second image stream by using the following formula:

$$P_2 = P_1 + (W_1 + W_2) * INR * Fps/2$$

where $P_2$ is the frame sequence number of the second I frame in the second image stream, $P_1$ is the frame sequence number of the second I frame in the first image stream, $W_1$ is the I-frame position weight of the first image stream, $W_2$ is the I-frame position weight of the second image stream, INR is the I-frame time interval, and Fps is the frame rate.

In a possible implementation, that the first device determines a frame sequence number of an $m^{th}$ I frame in the first image stream based on the frame sequence number of the second I frame in the first image stream, the I-frame time interval, and the frame rate includes: the first device determines the frame sequence number of the $m^{th}$ I frame in the first image stream by using the following formula:

$$P_m = P_{m-1} + INR * Fps$$

where $P_m$ is the frame sequence number of the $m^{th}$ I frame in the first image stream, $P_{m-1}$ is a frame sequence number of the $(m-1)^{th}$ I frame in the first image stream, INR is the I-frame time interval, and Fps is the frame rate; and that the first device determines a frame sequence number of an $m^{th}$ I frame in the second image stream based on the frame sequence number of the second I frame in the second image stream, the I-frame time interval, and the frame rate includes: the first device determines the frame sequence number of the $m^{th}$ I frame in the second image stream by using the following formula:

$$P'_m = P'_{m-1} + INR * Fps$$

where $P'_m$ is the frame sequence number of the $m^{th}$ I frame in the second image stream, $P'_{m-1}$ is a frame sequence number of the $(m-1)^{th}$ I frame in the second image stream, INR is the I-frame time interval, and Fps is the frame rate.

In a possible implementation, before the first device determines an I-frame position of the first image stream and an I-frame position of the second image stream based on the first resolution, the second resolution, an I-frame time interval, and a frame rate, the method further includes: the first device determines the I-frame time interval based on a current network bandwidth, a first bandwidth threshold, and a second bandwidth threshold, where the first bandwidth threshold is greater than the second bandwidth threshold.

In a possible implementation, that the first device determines the I-frame time interval based on a current network bandwidth, a first bandwidth threshold, and a second bandwidth threshold includes: if the current network bandwidth is greater than or equal to the first bandwidth threshold, the first device uses a first preset interval as the I-frame time interval; or if the current network bandwidth is greater than the second bandwidth threshold and less than the first bandwidth threshold, the first device determines the I-frame time interval based on the current network bandwidth, the first bandwidth threshold, the second bandwidth threshold, the first preset interval, and a second preset interval, where the second preset interval is greater than the first preset interval.

In a possible implementation, that the first device determines the I-frame time interval based on the current network bandwidth, the first bandwidth threshold, the second bandwidth threshold, the first preset interval, and a second preset interval includes: the first device determines the I-frame time interval by using the following formula:

$$INR = INR_{normal} + (INR_{max} - INR_{normal}) * (BW - TH_2)/(TH_1 - TH_2)$$

where INR is the I-frame time interval, $INR_{normal}$ is the first preset interval, $INR_{max}$ is the second preset interval, BW is the current network bandwidth, $TH_1$ is the first bandwidth threshold, and $TH_2$ is the second bandwidth threshold.

In a possible implementation, the I-frame position is a timestamp of an I frame; and that the first device determines an I-frame position of the first image stream and an I-frame position of the second image stream based on the first resolution, the second resolution, an I-frame time interval, and a frame rate includes: the first device determines a frame sequence number of the I frame in the first image stream and a frame sequence number of the I frame in the second image stream based on the first resolution, the second resolution, the I-frame time interval, and the frame rate; the first device determines a timestamp of the I frame in the first image stream based on the frame sequence number of the I frame in the first image stream, a timestamp of the first frame of image in the first image stream, and the frame rate; and the first device determines a timestamp of the I frame in the second image stream based on the frame sequence number of the I frame in the second image stream, the timestamp of the first frame of image in the second image stream, and the frame rate.

In a possible implementation, the first device further includes a third camera, and the method further includes: the second device sends a second instruction to the first device; the first device configures a third resolution according to the second instruction; the first device controls the third camera to capture images; the first device processes an image stream captured by the third camera to obtain a third image stream, where a resolution of the third image stream is the third resolution; and the first device determines an I-frame position of the first image stream, an I-frame position of the second image stream, and an I-frame position of the third image stream based on the first resolution, the second resolution, the third resolution, the I-frame time interval, and the frame rate.

In a possible implementation, that the first device determines an I-frame position of the first image stream, an I-frame position of the second image stream, and an I-frame position of the third image stream based on the first resolution, the second resolution, the third resolution, the I-frame time interval, and the frame rate includes: the first device updates frame sequence numbers of images captured by the first camera and the second camera to a frame sequence number of the first frame of image when the third camera captures the first frame of image; the first device uses the frame sequence number of the first frame of image in the first image stream as a frame sequence number of a first I frame in the first image stream, uses the frame sequence number of the first frame of image in the second image stream as a frame sequence number of a first I frame in the second image stream, and uses the frame sequence number of the first frame of image in the third image stream as a frame sequence number of a first I frame in the third image stream; the first device determines an I-frame position weight of the first image stream, an I-frame position weight of the second image stream, and an I-frame position weight of the third image stream based on the first resolution, the second resolution, and the third resolution; and the first device determines a frame sequence number of an $n^{th}$ I frame in the first image stream, a frame sequence number of an $n^{th}$ I frame in the second image stream, and a frame sequence number of an $n^{th}$ I frame in the third image stream based on the I-frame position weight of the first image stream, the I-frame position weight of the second image stream, the I-frame position weight of the third image stream, the I-frame time interval, and the frame rate, where n is greater than or equal to 2.

In a possible implementation, the method further includes: the second device sends a third instruction to the first device; the first device configures a fourth resolution according to the third instruction; the first device processes an image stream captured by the first camera to obtain a fourth image stream, where a resolution of the fourth image stream is the fourth resolution; and the first device determines the I-frame position of the second image stream and an I-frame position of the fourth image stream based on the second resolution, the fourth resolution, the I-frame time interval, and the frame rate.

In a possible implementation, that the first device determines the I-frame position of the second image stream and an I-frame position of the fourth image stream based on the second resolution, the fourth resolution, the I-frame time interval, and the frame rate includes: the first device updates the frame sequence numbers of the images captured by the first camera and the second camera to the frame sequence number of the first frame of image when the third instruction is received; the first device uses the frame sequence number of the first frame of image in the second image stream as a frame sequence number of a first I frame in the first image stream, and uses the frame sequence number of the first frame of image in the fourth image stream as a frame sequence number of a first I frame in the fourth image stream; the first device determines an I-frame position weight of the second image stream and an I-frame position weight of the fourth image stream based on the second resolution and the fourth resolution; and the first device determines a frame sequence number of an $n^{th}$ I frame in the second image stream and a frame sequence number of an $n^{th}$ I frame in the fourth image stream based on the I-frame position weight of the second image stream, the I-frame position weight of the fourth image stream, the I-frame time interval, and the frame rate, where n is greater than or equal to 2.

According to a second aspect, an embodiment of this application provides an encoding method, applied to a communication system, where the communication system includes a first device, a second device, and a third device. The method includes:

the third device separately sends a first instruction to the first device and the second device;

the first device configures a first resolution according to the first instruction; and processes an image stream captured by the first device to obtain a first image stream, where a resolution of the first image stream is the first resolution;

the second device configures a second resolution according to the first instruction; and processes an image stream captured by the second device to obtain a second image stream, where a resolution of the second image stream is the second resolution;

the third device determines an I-frame position of the first image stream and an I-frame position of the second image stream based on the first resolution, the second resolution, an I-frame time interval, and a frame rate; sends the I-frame position of the first image stream to the first device; and sends the I-frame position of the second image stream to the second device;

the first device encodes the first image stream based on the I-frame position of the first image stream to obtain a first compressed stream; and sends the first compressed stream to the third device; and the second device encodes the second image stream based on the I-frame position of the second image stream to obtain a second compressed stream; and sending the second compressed stream to the third device.

Because the first device compresses the first image stream, and the second device compresses the second image stream, the data amount of the two obtained compressed streams is far less than the data amount of the corresponding image streams, a time used for transmitting the two compressed streams to the third device is relatively short, and after receiving the two compressed streams, the third device decodes the two compressed streams to obtain the corresponding image streams, thereby resolving a delay problem caused by a long transmission time of the plurality of image streams. In addition, the third device calculates the I-frame positions in each of the two image streams based on the resolution, and sends the I-frame positions in each of the two image streams to corresponding devices, so that the first device generates I frames at corresponding positions based on the received I-frame positions, and the second device generates I frames at corresponding positions based on the received I-frame positions. Because the I frames in each of the two image streams are evenly distributed, the picture jitter problem caused by an instantaneous increase in the data amount when the I frames are concurrent can be avoided.

In a possible implementation, the I-frame position is a frame sequence number of an I frame; and that the third device determines an I-frame position of the first image stream and an I-frame position of the second image stream based on the first resolution, the second resolution, an I-frame time interval, and a frame rate includes: the third device uses a frame sequence number of the first frame of image in the first image stream as a frame sequence number of a first I frame in the first image stream, and uses a frame sequence number of the first frame of image in the second image stream as a frame sequence number of a first I frame in the second image stream; the third device determines an I-frame position weight of the first image stream and an I-frame position weight of the second image stream based on the first resolution and the second resolution; and the third device determines a frame sequence number of an $n^{th}$ I frame in the first image stream and a frame sequence number of an $n^{th}$ I frame in the second image stream based on the I-frame position weight of the first image stream, the I-frame position weight of the second image stream, the I-frame time interval, and the frame rate, where n is greater than or equal to 2.

In a possible implementation, that third device determines a frame sequence number of $n^{th}$ I frame in the first image stream and a frame sequence number of an $n^{th}$ I frame in the second image stream based on the I-frame position weight of the first image stream, the I-frame position weight of the second image stream, the I-frame time interval, and the frame rate includes: the third device determines a frame sequence number of a second I frame in the first image stream; the third device determines a frame sequence number of a second I frame in the second image stream based on the I-frame position weight of the first image stream, the I-frame position weight of the second image stream, the frame sequence number of the second I frame in the first image stream, the I-frame time interval, and the frame rate; the third device determines a frame sequence number of an $m^{th}$ I frame in the first image stream based on the frame sequence number of the second I frame in the first image stream, the I-frame time interval, and the frame rate, where m is greater than or equal to 3; and the third device determines a frame sequence number of an $m^{th}$ I frame in the second image stream based on the frame sequence number of the second I frame in the second image stream, the I-frame time interval, and the frame rate, where m is greater than or equal to 3.

In a possible implementation, that the third device determines an I-frame position weight of the first image stream and an I-frame position weight of the second image stream based on the first resolution and the second resolution includes: the third device determines the I-frame position weight of the first image stream by using the following formula:

$$W_1 = \frac{S_1}{S_1 + S_2}$$

where $W_1$ is the I-frame position weight of the first image stream, $S_1$ is the first resolution, and $S_2$ is the second resolution; and the third device determines the I-frame position weight of the second image stream by using the following formula:

$$W_2 = \frac{S_2}{S_1 + S_2}$$

where $W_2$ is the I-frame position weight of the second image stream, $S_1$ is the first resolution, and $S_2$ is the second resolution.

In a possible implementation, that the third device determines a frame sequence number of a second I frame in the second image stream based on the I-frame position weight of the first image stream, the I-frame position weight of the second image stream, the frame sequence number of the second I frame in the first image stream, the I-frame time interval, and the frame rate includes: the third device determines the frame sequence number of the second I frame in the second image stream by using the following formula:

$$P_2 = P_1 + (W_1 + W_2) * INR * Fps/2$$

where $P_2$ is the frame sequence number of the second I frame in the second image stream $P_1$ is the frame sequence number of the second I frame in the first image stream $W_1$ is the I-frame position weight of the first image stream, $W_2$ is the I-frame position weight of the second image stream, INR is the I-frame time interval, and Fps is the frame rate.

In a possible implementation, that the third device determines a frame sequence number of an $m^{th}$ I frame in the first image stream based on the frame sequence number of the second I frame in the first image stream, the I-frame time interval, and the frame rate includes: the third device determines the frame sequence number of an $m^{th}$ I frame in the first image stream by using the following formula:

$$P_m = P_{m-1} + INR * Fps$$

where $P_m$ is the frame sequence number of the $m^{th}$ I frame in the first image stream, $P_{m-1}$ is a frame sequence number of the $(m-1)^{th}$ I frame in the first image stream, INR is the I-frame time interval, and Fps is the frame rate; and that the third device determines a frame sequence number of an $m^{th}$ I frame in the second image stream based on the frame sequence number of the second I frame in the second image stream, the I-frame time interval, and the frame rate includes: the third device determines the frame sequence number of the $m^{th}$ I frame in the second image stream by using the following formula:

$$P'_m = P'_{m-1} + INR * Fps$$

where $P'_m$ is the frame sequence number of the $m^{th}$ I frame in the second image stream, $P'_{m-1}$ is a frame sequence number of the $(m-1)^{th}$ I frame in the second image stream, INR is the I-frame time interval, and Fps is the frame rate.

In a possible implementation, before the third device determines an I-frame position of the first image stream and an I-frame position of the second image stream based on the first resolution, the second resolution, an I-frame time interval, and a frame rate, the method further includes: the third device determines the I-frame time interval based on a current network bandwidth, a first bandwidth threshold, and a second bandwidth threshold, where the first bandwidth threshold is greater than the second bandwidth threshold.

In a possible implementation, that the third device determines the I-frame: time interval based on a current network bandwidth, a first bandwidth threshold, and a second bandwidth threshold includes: if the current network bandwidth is greater than or equal to the first bandwidth threshold, the third device uses a first preset interval as the I-frame time interval; or if the current network bandwidth is greater than the second bandwidth threshold and less than the first bandwidth threshold, the third device determines the I-frame time interval based on the current network bandwidth, the first bandwidth threshold, the second bandwidth threshold, the first preset interval, and a second preset interval, where the second preset interval is greater than the first preset interval.

In a possible implementation, that the third device determines the I-frame time interval based on the current network bandwidth, the first bandwidth threshold, the second bandwidth threshold, the first preset interval, and a second preset interval includes: the third device determines the I-frame time interval by using the following formula:

$$INR = INR_{normal} + (INR_{max} - INR_{normal}) * (BW - TH_2) / (TH_1 - TH_2)$$

where INR is the I-frame time interval, $INR_{normal}$ is the first preset interval, $INR_{max}$ is the second preset interval, BW is the current network bandwidth, $TH_1$ is the first bandwidth threshold, and $TH_2$ is the second bandwidth threshold.

According to the encoding method provided in the second aspect, the first device is also referred to as a remote device 1 in the embodiments of this application, the second device is also referred to as a remote device 1 in the embodiments of this application, and the third device is also referred to as a local device in the embodiments of this application.

According to a third aspect, an embodiment of this application provides an electronic device, including a memory and a processor. The processor is configured to be coupled to the memory, and read and execute instructions in the memory, so that the electronic device implements the steps performed by the first device in the encoding method according to the first aspect.

According to a fourth aspect, an embodiment of this application provides an electronic device, including a memory and a processor. The processor is configured to be coupled to the memory, and read and execute instructions in the memory, so that the electronic device implements the steps performed by the second device in the encoding method according to the first aspect.

According to a fifth aspect, an embodiment of this application provides a communication system, including the electronic device according to the third aspect and the electronic device according to the fourth aspect.

According to a sixth aspect, an embodiment of this application provides an electronic device, including a memory and a processor. The processor is configured to be coupled to the memory, and read and execute instructions in the memory, so that the electronic device implements the steps performed by the first device in the encoding method according to the second aspect.

According to a seventh aspect, an embodiment of this application provides an electronic device, including a memory and a processor. The processor is configured to be coupled to the memory, and read and execute instructions in the memory, so that the electronic device implements the steps performed by the second device in the encoding method according to the second aspect.

According to an eighth aspect, an embodiment of this application provides an electronic device, including a memory and a processor. The processor is configured to be coupled to the memory, and read and execute instructions in the memory, so that the electronic device implements steps performed by a third device in the encoding method according to the second aspect.

According to a ninth aspect, an embodiment of this application provides a communication system, including the electronic device according to the sixth aspect, the electronic device according to the seventh aspect, and the electronic device according to the eighth aspect.

According to a tenth aspect, an embodiment of this application provides a readable storage medium. The readable storage medium stores a computer program. When the computer program is executed, the steps performed by the first device in the encoding method according to the first aspect are implemented, or the steps performed by the second device in the encoding method according to the first aspect are implemented, or the steps performed by the first device in the encoding method according to the second aspect are implemented, or the steps performed by the second device in the encoding method according to the second aspect are implemented, or the steps performed by the third device in the encoding method according to the second aspect are implemented.

According to an eleventh aspect, an embodiment of this application provides a computer program product. When instructions included in the computer program product are run on a computer, the computer is enabled to implement the steps performed by the first device in the encoding method according to the first aspect, or implement the steps performed by the second device in the encoding method according to the first aspect, or implement the steps performed by the first device in the encoding method according to the second aspect, or implement the steps performed by the second device in the encoding method according to the second aspect, or implement the steps performed by the third device in the encoding method according to the second aspect.

According to the encoding method, the electronic device, the communication system, the storage medium, and the program product provided in the embodiments of this application, a plurality of image streams are separately compressed, and a data amount of each of the plurality of obtained compressed streams is far less than a data amount of the corresponding image streams, a time used for transmitting the plurality of compressed streams to a local device is relatively short, and after receiving the plurality of compressed streams, the local device can decode the plurality of compressed streams to obtain corresponding image streams, thereby resolving a delay problem caused by a relatively long transmission time of the plurality of image streams. In addition, before the plurality of image streams are compressed, the I-frame positions of the plurality of image streams are calculated based on resolutions, and I frames are generated at corresponding positions for each image stream, so that the I frames in each of the plurality of image streams are evenly distributed, thereby avoiding the picture jitter problem caused by the instantaneous increase of the data amount when the I frames are concurrent.

DESCRIPTION OF EMBODIMENTS

To help a person skilled in the art understand the solutions in embodiments of this application, the following explains some terms used in embodiments of this application.

Figure 1:
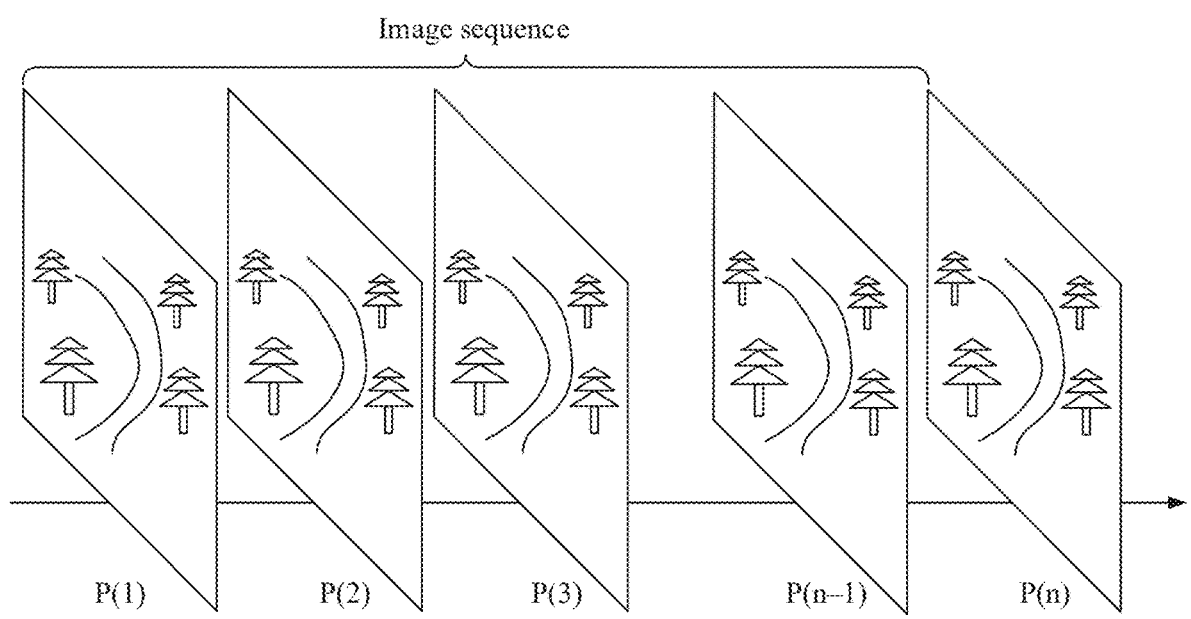
FIG. 1 is a schematic diagram of an image sequence according to an embodiment of this application.

Image stream: an image sequence output after an image signal processing (Image Signal Processing, ISP) module processes an image stream captured by a camera. Based on the time sequence, a frame sequence number of the first frame of image captured by the camera is denoted as P(1), a frame sequence number of the second frame of image is denoted as P(2), . . . , and a frame sequence number of the $n^{th}$ frame of image is denoted as P(n). Refer to FIG. 1. Frame sequence numbers of an image sequence output by an ISP module are consistent with frame sequence numbers of images captured by a camera, and are sequentially P(1), P(2), . . . , and P(n). The ISP module can output a plurality of image streams after processing image streams captured by a plurality of cameras.

Figure 2:
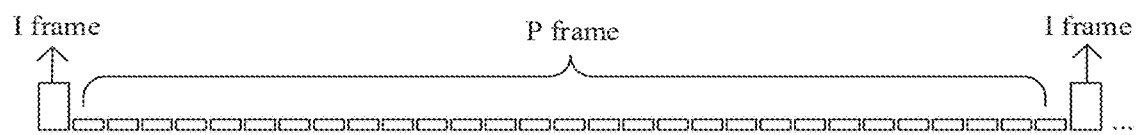
FIG. 2 is a schematic diagram of a compressed stream according to an embodiment of this application.

Compressed stream: An image stream has a large amount of data. To facilitate storage of the image stream or transmission of the image stream through a network, the image stream needs to be compressed. The compressed stream may be understood as a frame sequence obtained by compressing each frame of image in the image stream. When the image is compressed, the image is compressed by using an intra-frame compression algorithm, so as to obtain an I-frame. The I-frame carries all information required for decoding, and therefore the data amount of the I-frame is large. The image is compressed by using the inter-frame compression algorithm to obtain a P-frame. The P-frame carries a difference between the current frame of image and the previous frame of image. The data amount of the P-frame is smaller than that of the I-frame. FIG. 2 shows a compressed stream obtained after the image stream shown in FIG. 1 is compressed.

Timestamp: a moment at which the camera captures images. It is assumed that a moment at which the camera captures the first frame of image is T(1), a moment at which the camera captures the second frame of image is T(2), . . . , and a moment at which the camera captures the $n^{th}$ frame of image is T(n). In this case, in the image sequence output by the ISP module, a timestamp of the first frame of image is T(1), a timestamp of the second frame of image is T(2), a timestamp of the third frame of image is T(3) . . . , and a timestamp of the $n^{th}$ frame of image is T(n).

Local device: a device that needs to obtain a plurality of image streams by another device. A form of the local device includes but is not limited to a mobile phone, a tablet computer, a notebook computer, or a television.

Remote device: a device used to send image streams to the local device. A form of the remote device includes but is not limited to: a mobile phone, a tablet computer, a notebook computer, or an uncrewed aerial vehicle. The local device and the remote device may be connected by using Bluetooth (Bluetooth), wireless Internet access (Wi-Fi), the fourth generation mobile communication technology (the 4th generation mobile communication technology, 4G), or the fifth generation mobile communication technology (5th generation mobile networks, 5G).

Figure 3:
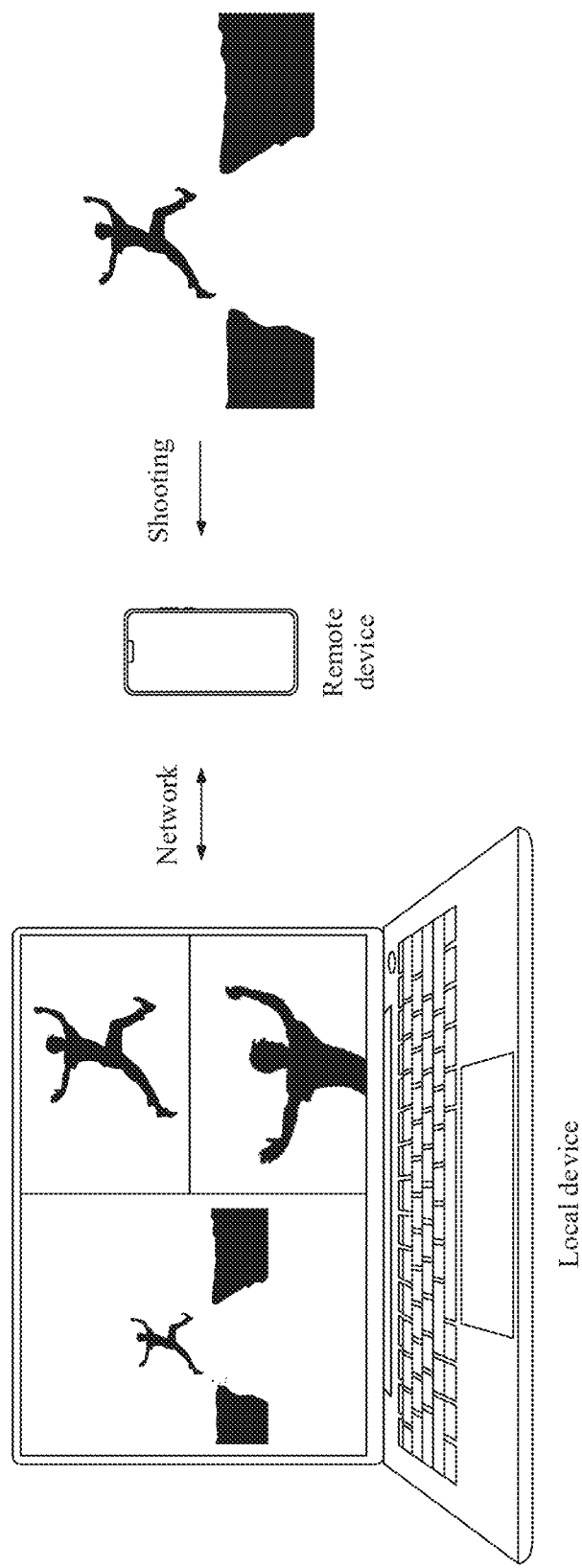
FIG. 3 is a schematic diagram 1 of an application scenario according to an embodiment of this application.

FIG. 3 is a diagram 1 of an application scenario according to an embodiment of this application. A communication system shown in FIG. 3 includes a local device and a remote device. The remote device includes a plurality of cameras, and the plurality of cameras may synchronously capture images. The local device may send a shooting instruction to the remote device through a network. After receiving the shooting instruction, the remote device controls a plurality of cameras to capture images, and sends, through the network, a plurality of image streams output by the ISP module to the local device. The local device may display the plurality of image streams for a user to view. In this way, the local device obtains a plurality of image streams by using a plurality of cameras of the remote device. In FIG. 3, an example in which the local device is a notebook computer and the remote device is a mobile phone is used for illustration, and this does not constitute a limitation on this embodiment of this application. A plurality of cameras on the remote device may include a wide-angle camera, a primary camera, and a long-focus camera.

Figure 4:
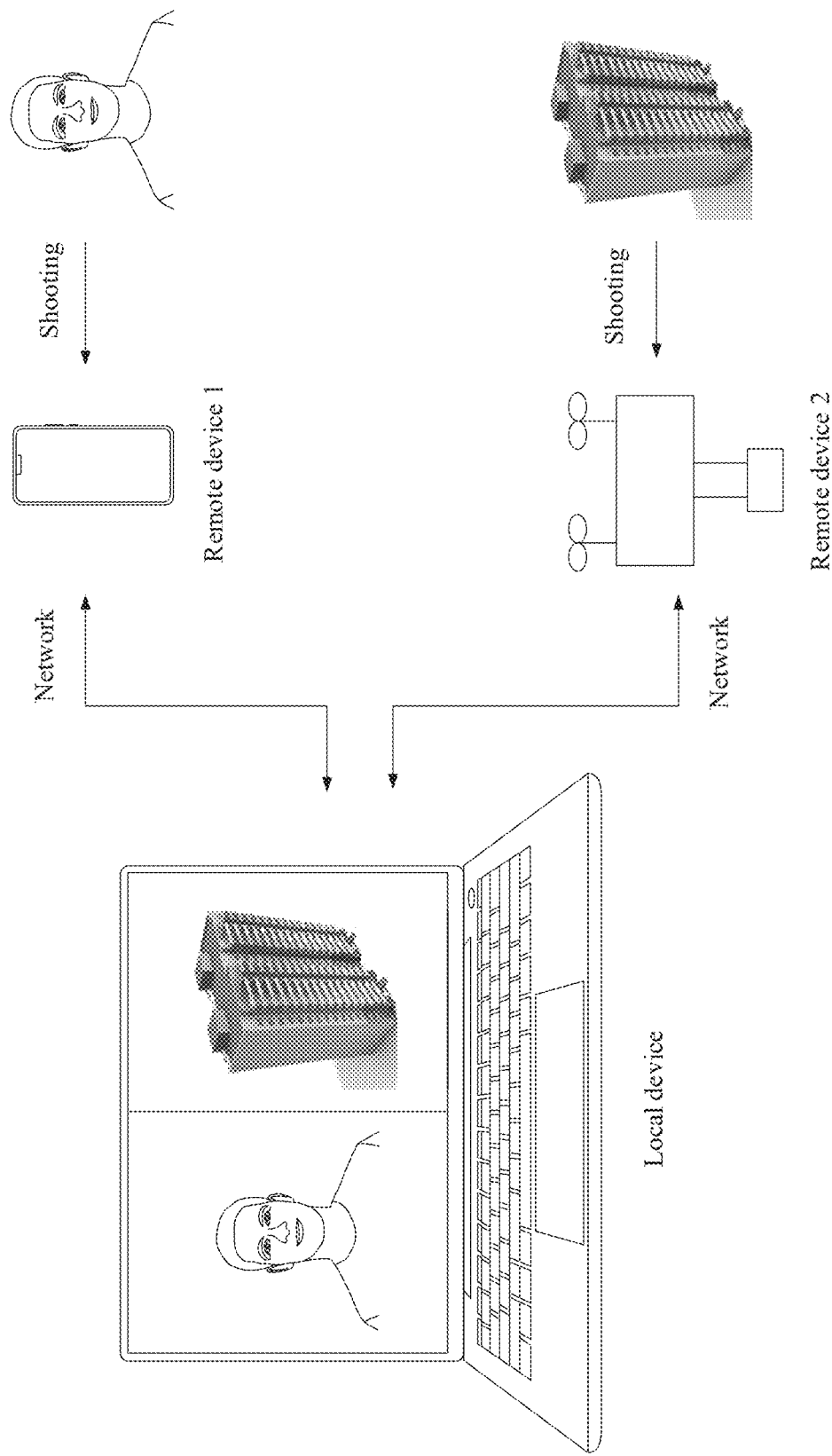
FIG. 4 is a schematic diagram 2 of an application scenario according to an embodiment of this application.

FIG. 4 is an application scenario diagram 2 according to an embodiment of this application. A communication system shown in FIG. 4 includes a local device and at least two remote devices. That the at least two remote devices include a remote device 1 and a remote device 2 is used as an example in FIG. 4, The local device may separately send a shooting instruction to the remote device 1 and the remote device 2 through a network. After receiving the shooting instruction, the remote device 1 controls the remote device 1 to capture images, and sends the image stream output by the ISP module to the local device through the network; and after receiving the shooting instruction, the remote device 2 controls the remote device 2 to capture images, and sends the image stream output by the ISP module to the local device through the network. In this way, the local device can simultaneously display the image streams sent by the two remote devices. In FIG. 4, an example in which the local device is a notebook computer, the remote device 1 is a mobile phone, and the remote device 2 is an unmanned aerial vehicle is used for illustration. This does not constitute a limitation on this embodiment of this application.

Figure 5:
FIG. 5 is a schematic diagram of concurrent I frames in a scenario shown in FIG. 3 according to an embodiment of this application.
Figure 6:
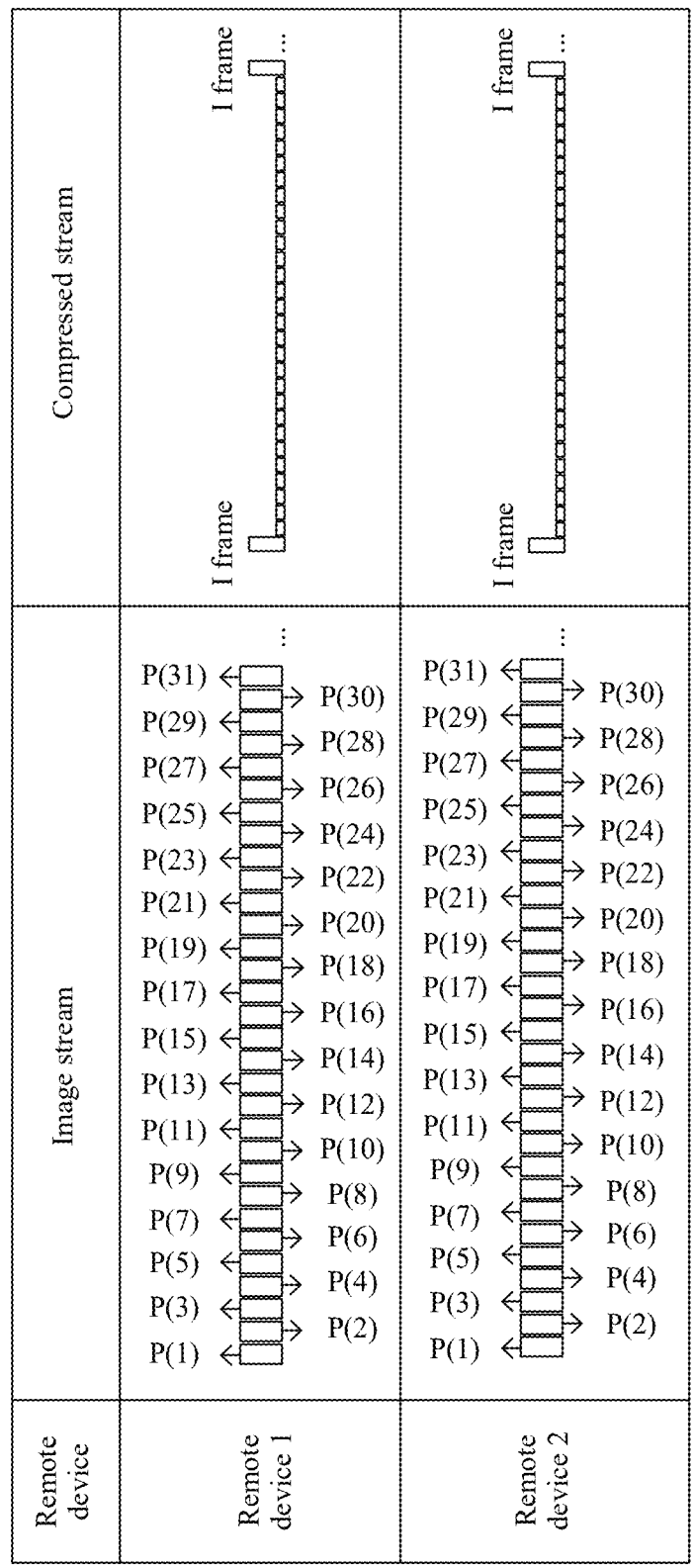
FIG. 6 is a schematic diagram of concurrent I frames in a scenario shown in FIG. 4 according to an embodiment of this application.

In the scenario shown in FIG. 3, because the data amount of each image stream output by the ISP module is large and the network bandwidth is limited, the remote device needs to compress each image stream. Similarly, in the scenario shown in FIG. 4, the remote device 1 and the remote device 2 also need to compress the image stream output by the ISP module. Specifically, refer to FIG. 5. In the scenario shown in FIG. 3, when image streams corresponding to the wide-angle camera, the primary camera, and the long-focus camera are compressed, to enable the local device to perform decoding smoothly, the first frame of image in each image stream needs to be encoded into an I-frame. In the case of a same I-frame interval, subsequent I-frames simultaneously occur in the three compressed streams, and a data amount of the I-frames is relatively large. This causes an instantaneous increase in the amount of data transmitted through the network, a display picture of the local device jitters, and user experience is affected. Similarly, as shown in FIG. 6, in the scenario shown in FIG. 4, when compressing the image stream output by the ISP module, the remote device 1 needs to encode the first frame of image in the image stream into an I-frame, and when compressing the image stream output by the ISP module, the remote device 2 also needs to encode the first frame of image in the image stream into an I-frame. In the case of a same I-frame interval, subsequent I-frames simultaneously occur in the two compressed streams. This also causes an instantaneous increase in the amount of data transmitted through the network, and a display picture of the local device jitters.

Figure 7:
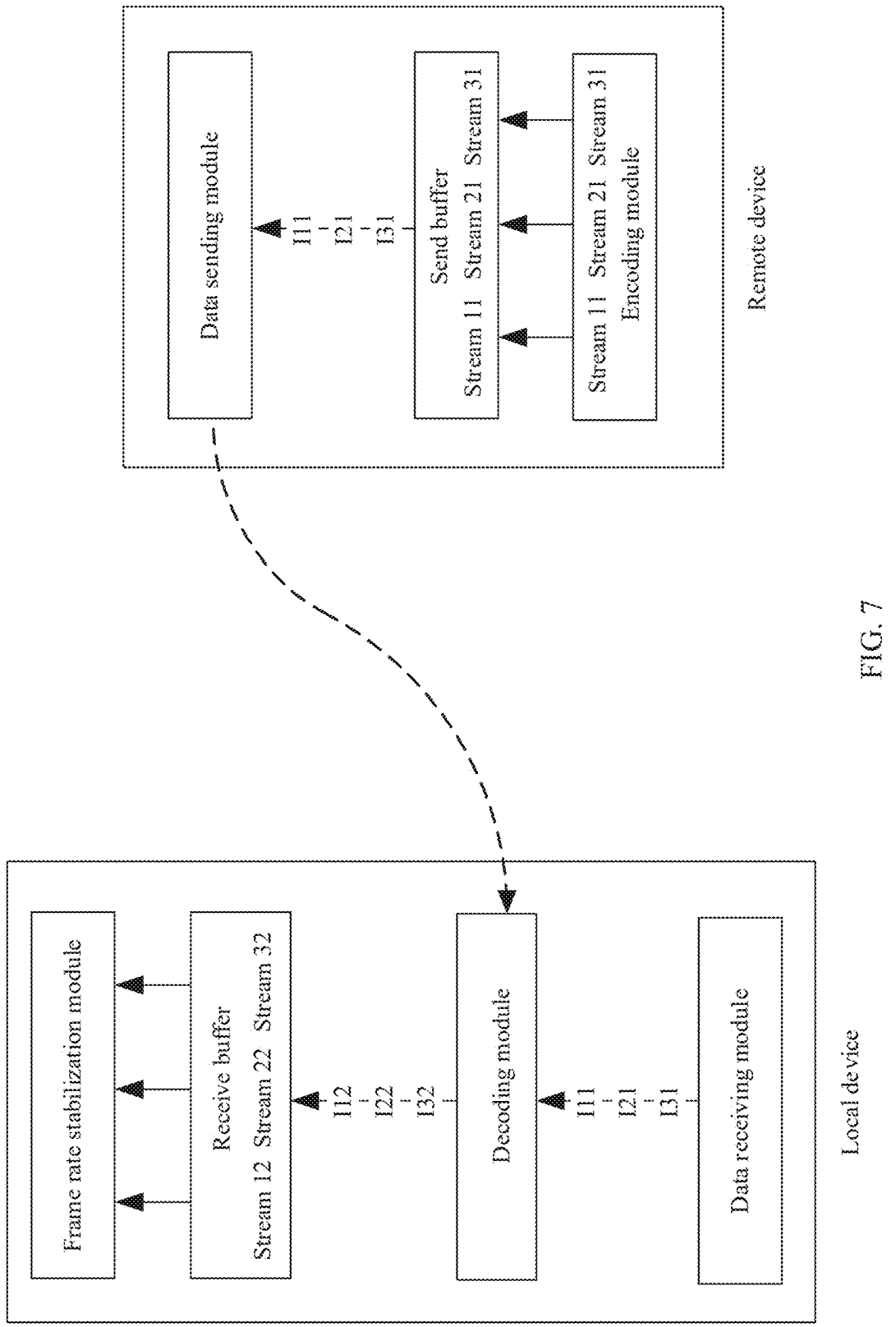
FIG. 7 is a diagram of a software framework according to an embodiment of this application.

In some embodiments, in the scenario shown in FIG. 3, the foregoing picture jitter problem may be resolved in the following manner:

As shown in FIG. 7, an encoding module, a send buffer, and a data sending module are disposed in the remote device. The encoding module is configured to encode each image stream to obtain a compressed stream of each image stream, and store the compressed stream of each image stream to the send buffer. FIG. 7 shows three compressed streams, which are respectively represented by a stream 11, a stream 21, and a stream 31. The data sending module is configured to determine whether to-be-sent image frames in each compressed stream are all I-frames; and if the to-be-sent image frames in each compressed stream are all I-frames, send the I-frames in each compressed stream in sequence, for example, first send an I-frame I11 in the stream 11, then send an I-frame I21 in the stream 21, and then send an I-frame I31 in the stream 31, so as to avoid the problem that the amount of data transmitted through the network increases instantaneously when the I-frames in the image streams are concurrent.

A data receiving module, a decoding module, a receive buffer, and a frame rate stabilization module are disposed in the local device. The data receiving module is configured to receive each compressed stream sent by the data sending module. The decoding module is configured to decode each compressed stream to obtain each decoded image stream, and store the decoded image stream to the receive buffer. In FIG. 7, a stream 12 is used to represent an image stream obtained after the stream 11 is decoded, a stream 22 is used to represent an image stream obtained after the stream 21 is decoded, and a stream 32 is used to represent an image stream obtained after the stream 31 is decoded. The frame rate stabilization module is configured to obtain each channel of image to be output from the receive buffer, and send the image to a data consumption module, thereby ensuring that each image stream is transmitted to the data consumption module at a same frame interval. When I-frames in each compressed stream in the remote device are concurrent, the data sending module does not send the I-frames in each compressed stream at the same time. As a result, the time when the I-frames in each compressed stream arrive at the decoding module varies greatly. In FIG. 7, I12 is used to represent the image obtained after I11 is decoded, I22 is used to represent the image obtained after I21 is decoded, and I32 is used to represent the image obtained after I31 is decoded, the frame rate stabilization module needs to wait for a relatively long time to obtain the I12, I22, and I32 to be output, and output of the frame rate stabilization module to the data consumption module is delayed, which causes an increase in a delay from the remote device to the local device, and deteriorates real-time experience of the user.

An embodiment of this application provides an encoding and decoding method. To avoid concurrent I-frames of each image stream, an I-frame position of each image stream is calculated based on a resolution, and an I-frame is generated at a corresponding position for each image stream, so that the I-frames in each image stream are evenly distributed, thereby avoiding concurrent I-frames of each image stream. In addition, compared with the foregoing embodiment, this method does not increase a delay from a remote device to a local device, thereby improving user experience.

In the scenario shown in FIG. 3, there are three scenarios in which the local device controls the remote device:

Scenario 1: The local device does not control any camera on the remote device to capture images.

Scenario 2: On the basis that the local device has controlled the first camera and the second camera on the remote device to capture images, the local device also needs to control the third camera on the remote device to capture images.

Scenario 3: On the basis that the local device has controlled the first camera and the second camera on the remote device to capture images, a user needs to change a resolution of one image stream.

For scenario 1, the user may control, by triggering a first instruction, the first camera and the second camera on the remote device to capture images. For an interaction process between the local device and the remote device, refer to FIG. 8. The interaction process specifically includes the following steps.

S801: The local device sends a first instruction to the remote device. The first instruction may carry a first resolution and a second resolution. The first instruction is used to adjust a resolution parameter value corresponding to the first camera in an ISP module, and is further used to adjust a resolution parameter value corresponding to the second camera in the ISP module.

S802: The remote device configures the first resolution and the second resolution according to the first instruction.

The remote device may adjust the resolution parameter value corresponding to the first camera in the ISP module to the first resolution, and adjust the resolution parameter value corresponding to the second camera in the ISP module to the second resolution.

S803: The remote device controls the first camera and the second camera to capture images.

S804: The remote device processes an image stream captured by the first camera to obtain a first image stream, and processes an image stream captured by the second camera to obtain a second image stream.

The ISP module may separately process the image stream captured by the first camera and the image stream captured by the second camera. Because the resolution parameter value corresponding to the first camera in the ISP module is adjusted to the first resolution in S802, the resolution of the first image stream obtained by the ISP module through processing is the first resolution. In S802, the resolution parameter value corresponding to the second camera in the ISP module is adjusted to the second resolution. Therefore, the resolution of the second image stream obtained by the ISP through processing is the second resolution.

For example, the first resolution is 2048×1080, and the second resolution is 1920×1080. The first camera is, for example, a wide-angle camera, and the second camera is, for example, a primary camera. The remote device receives the first instruction, adjusts a resolution parameter value corresponding to the wide-angle camera in the ISP module to 2048×1080, and configures a resolution parameter of the primary camera to 1920×1080. The ISP module separately processes an image stream captured by the wide-angle camera and an image stream captured by the primary camera. After the foregoing resolution parameter values are adjusted, a resolution of the first image stream obtained through processing is 2048×1080, and a resolution of the second image stream is 1920×1080.

It should be noted that S803 may be performed before S802, or S803 and S802 may be simultaneously performed. An execution sequence of the two steps is not limited in this embodiment of this application.

The first resolution and the second resolution in the first instruction may be specified by the user.

S805: The remote device determines an I-frame position of the first image stream and an I-frame position of the second image stream based on the first resolution, the second resolution, an I-frame time interval, and a frame rate.

The I-frame position may be represented by a frame sequence number, or may be represented by a timestamp.

The following describes an implementation of determining the frame sequence number of the I frame.

To facilitate decoding by the local device, a frame sequence number P(1) of the first frame of image in the first image stream may be used as a frame sequence number of the first I frame in the first image stream; and similarly, a frame sequence number P(1) of the first frame of image in the second image stream may be used as a frame sequence number of the first I frame in the second image stream.

Because the first frame in each compressed stream is an I-frame, as described above, concurrency of a plurality of I-frames causes jitter of a display picture of the local device. To reduce the user's perception of jitter of the first frame, for each image stream, after decoding the I-frame, the local device buffers an image obtained through decoding, and starts to display the first frame of image after decoding a plurality of subsequent images, so that the first frame of image displayed by the local device is quickly covered by a subsequent image. This reduces the user's perception of jitter.

Figure 9:
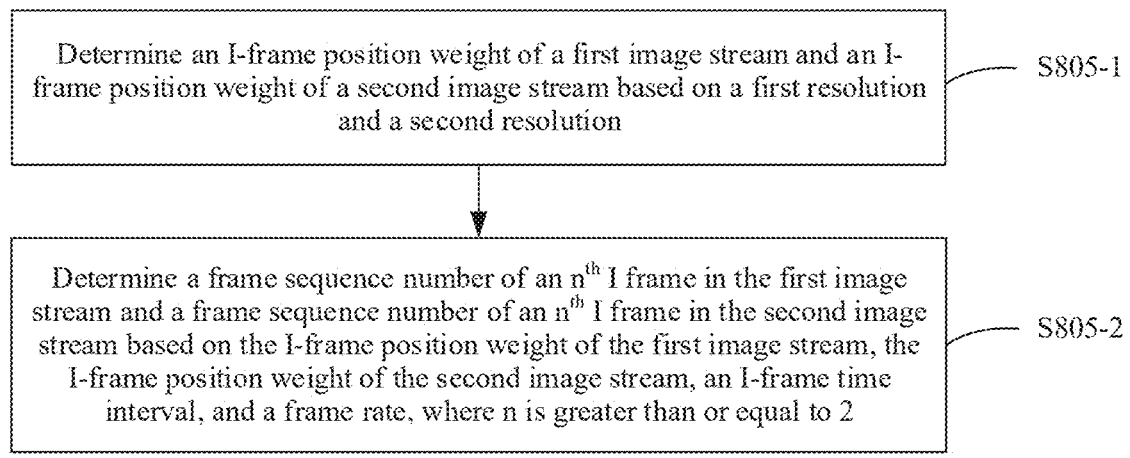
FIG. 9 is a flowchart of determining a frame sequence number of a second I frame according to an embodiment of this application.

The frame sequence number of the second I frame may be determined by using the method shown in FIG. 9. Refer to FIG. 9. The method specifically includes the following steps.

S805-1: Determine an I-frame position weight of the first image stream and an I-frame position weight of the second image stream based on the first resolution and the second resolution.

The I-frame position weight may be calculated by using the following formula:

$$W_i = \frac{S_i}{\sum S_j}$$

where $W_i$ is the I-frame position weight of the $i^{th}$ image stream, $S_i$ is the resolution of the $i^{th}$ image stream, and $S_j$ is the resolution of the $j^{th}$ image stream.

The I-frame position weight of the first image stream may be obtained by using the foregoing formula:

$$W_1 = \frac{S_1}{S_1 + S_2}$$

where $W_1$ is the I-frame position weight of the first image stream, $S_1$ is the first resolution, and $S_2$ is the second resolution.

The I-frame position weight of the second image stream is:

$$W_2 = \frac{S_2}{S_1 + S_2}$$

where $W_2$ is the I-frame position weight of the second image stream, $S_1$ is the first resolution, and $S_2$ is the second resolution.

Descriptions are provided below by using an example.

The first resolution is, for example, 2048×1080, and the second resolution is, for example, 1920×1080. The I-frame position weight of the first image stream may be obtained by using the foregoing formula:

$$\frac{2048 \times 1080}{1920 \times 1080 + 2048 \times 1080} \approx 0.52$$

The I-frame position weight of the second image stream is:

$$\frac{1920 \times 1080}{2048 \times 1080 + 1920 \times 1080} \approx 0.48$$

S805-2: Determine a frame sequence number of an $n^{th}$ I frame in the first image stream and a frame sequence number of an $n^{th}$ I frame in the second image stream based on the I-frame position weight of the first image stream, the I-frame position weight of the second image stream, the I-frame time interval, and the frame rate, where n is greater than or equal to 2.

First, a frame sequence number of the second I frame in the first image stream is determined.

Then, the frame sequence number of the second I frame in the second image stream is determined based on the I-frame position weight of the first image stream, the I-frame position weight of the second image stream, the frame sequence number of the second I frame in the first image stream, the I-frame time interval, and the frame rate.

The frame sequence number of the second I frame in the $i^{th}$ image stream may be calculated by using the following formula:

$$P_i = P_{j-1} + (W_{i-1} + W_i)*\text{INR}*\text{Fps}/2$$

where $P_i$ indicates the frame sequence number of the second I frame in the $i^{th}$ image stream, $W_i$ indicates the I-frame position weight of the $i^{th}$ image stream, $P_{i-1}$ indicates the frame sequence number of the second I frame in the $(i-1)^{th}$ image stream, and $W_{i-1}$ indicates the I-frame position weight of the $(i-1)^{th}$ image stream. INR is the I-frame time interval, and Fps is the frame rate.

The frame sequence number of the second I frame in second image stream may be obtained by using the foregoing formula:

$$P_2 = P_1 + (W_1 + W_2)*\text{INR}*\text{Fps}/2$$

where $P_2$ is the frame sequence number of the second I frame in the second image stream, $P_1$ is the frame sequence number of the second I frame in the first image stream, $W_1$ is the I-frame position weight of the first image stream, and $W_2$ is the I-frame position weight of the second image stream.

INR and Fps may be default values. For example, the INR may be 1 s, and the Fps may be 30 frames/s.

The INR may also be obtained in the following manner: determining the I-frame time interval based on a current network bandwidth, a first bandwidth threshold, and a second bandwidth threshold, where the first bandwidth threshold is greater than the second bandwidth threshold.

In a possible implementation, the remote device may monitor network bandwidth BW in real time, and compare the network bandwidth BW with the first bandwidth threshold TH1 and the second bandwidth threshold TH2. When the network bandwidth BW is greater than or equal to TH1, the I-frame time interval is set to a first preset interval to ensure image quality. When the network bandwidth BW is less than or equal to TH2, it is considered that current network quality cannot support transmission of a plurality of image streams, and prompt information is displayed to remind the user that the network bandwidth is insufficient. When the network bandwidth BW is greater than TH2 and less than TH1, the I-frame time interval is determined based on the current network bandwidth, the first bandwidth threshold, the second bandwidth threshold, the first preset interval, and a second preset interval, where the second preset interval is greater than the first preset interval.

In a possible implementation, the I-frame time interval is calculated by using the following formula 1:

$$\text{INR} = \text{INR}_{normal} + (\text{INR}_{max} - \text{INR}_{normal})*(BW - TH_2)/(TH_1 - TH_2) \quad \text{(Formula 1)}$$

where INR represents the I-frame time interval, $\text{INR}_{normal}$ represents the first preset interval, $\text{INR}_{max}$ represents a maximum acceptable I-frame time interval, and is also referred to as the second preset interval in this embodiment of this application.

The following describes the method shown in FIG. 9 by using an example.

It is assumed that the frame sequence number of the second I frame in the first image stream is specified as P(5), that is, $P_1 = P(5)$, INR is 1 s, Fps is 30 frames/s, the I-frame position weight of the first image stream and the I-frame position weight of the second image stream that are obtained through calculation in S10 are 0.52 and 0.48, respectively. In this case, the frame sequence number $P_2$ of the second I frame in the second image stream is:

$$P_2 = P(5 + (0.52 + 0.48)*1*30/2) \approx P(20)$$

Figure 10:
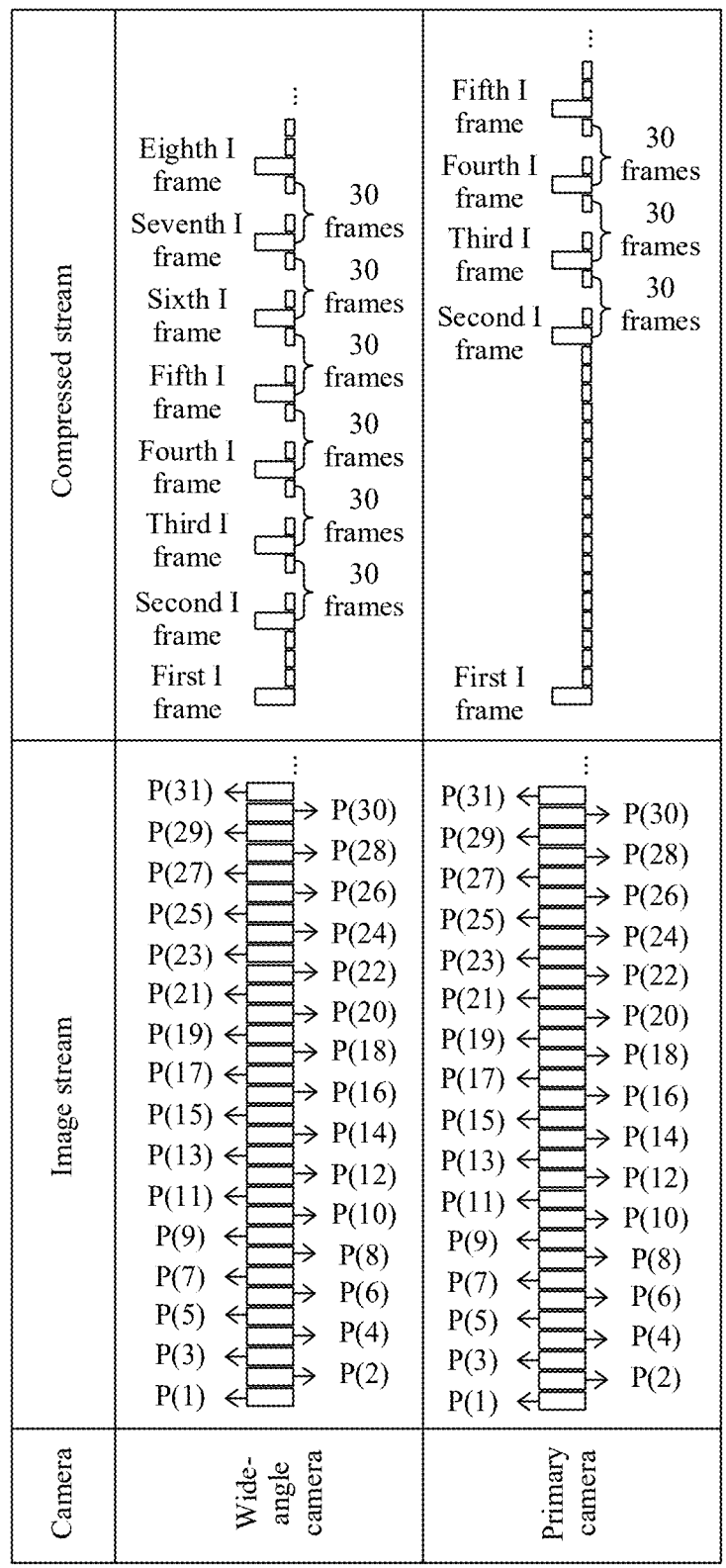
FIG. 10 is a diagram of distribution of I frames in the scenario shown in FIG. 3 according to an embodiment of this application.

Refer to FIG. 10. The second I-frames in both the first image stream and the second image stream are evenly distributed, thereby avoiding concurrency of I frames.

After the frame sequence number of the second I frame in the first image stream and the frame sequence number of the second I frame in the second image stream are obtained by using the method shown in FIG. 9, the frame sequence number of the $m^{th}$ I frame in the first image stream is determined based on the frame sequence number of the second I frame in the first image stream, the I-frame time interval, and the frame rate, and the frame sequence number of the $m^{th}$ I frame in the second image stream is determined based on the frame sequence number of the second I frame in the second image stream, the I-frame time interval, and the frame rate, where m is greater than or equal to 3.

In a possible implementation, the frame sequence number of the $m^{th}$ I frame in the first image stream may be determined by using the following formula:

$$P_m = P_{m-1} + \text{INR}*\text{Fps}$$

where $P_m$ is the frame sequence number of the $m^{th}$ I frame in the first image stream, $P_{m-1}$ is a frame sequence number of the $(m-1)^{th}$ I frame in the first image stream, INR is the I-frame time interval, and Fps is the frame rate.

The frame sequence number of the $m^{th}$ I frame in the second image stream may be determined by using the following formula:

$$P'_m = P'_{m-1} + \text{INR}*\text{Fps}$$

where $P'_m$ is the frame sequence number of the $m^{th}$ I frame in the second image stream, $P'_{m-1}$ is a frame sequence number of the $(m-1)^{th}$ I frame in the second image stream, INR is the I-frame time interval, and Fps is the frame rate.

Descriptions are provided below by using an example.

It is assumed that INR is 1 s, and Fps is 30 frames/s, and the frame sequence number of the second I frame in the first image stream is P(5). In this case, the frame sequence number of the third I frame in the first image stream is P(5+1*30)=P(35). If the frame sequence number of the second I frame in the second image stream is P(20), the frame sequence number of the third I frame in the image stream corresponding to the primary camera is P(20+1*30)=P(50).

It should be noted that, as shown in FIG. 10, because the second I-frames in each image stream are evenly distributed, the intervals between the I-frames in each image stream are the same, and therefore the subsequent I-frames in each image stream are also evenly distributed.

The following describes an implementation of determining the timestamp of the I frame.

First, the frame sequence number of the I frame in the first image stream and the frame sequence number of the I frame in the second image stream are determined based on the first resolution, the second resolution, the I-frame time interval, and the frame rate. For a specific process, refer to the foregoing descriptions. Details are not described in this embodiment of this application again. Then, the timestamp of the I frame in the first image stream is determined based on the frame sequence number of the I frame in the first image stream, and the timestamp and the frame rate of the first frame of image in the first image stream; and the timestamp of the I frame in the second image stream is determined based on the frame sequence number of the I frame in the second image stream, and the timestamp and the frame rate of the first frame of image in the second image stream.

In a possible implementation, the first image stream is used as an example, and the timestamp of the I frame may be determined by using formula 2:

$$T_i = T + (P_i - 1) * 1/\text{Fps} \quad \text{(Formula 2)}$$

where $P_i$ represents the frame sequence number of the I frame in the first image stream, $T_i$ represents the timestamp of the I frame in the first image stream, T represents the timestamp of the first frame of image in the first image stream, and Fps represents the frame rate.

S806: The remote device encodes the first image stream based on the I-frame position of the first image stream to obtain a first compressed stream, and encodes the second image stream based on the I-frame position of the second image stream to obtain a second compressed stream.

In a possible implementation, based on the obtained frame sequence number of the I frame in the first image stream, it is determined whether a frame sequence number of a to-be-encoded image in the first image stream is the same as the frame sequence number of the I frame. If the frame sequence numbers are the same, the image is encoded as an I frame; or if the frame sequence numbers are different, the image is encoded as a P frame. Similarly, it is determined whether a frame sequence number of a to-be-encoded image in the second image stream is the same as the frame sequence number of the I frame in the second image stream. If the frame sequence numbers are the same, the image is encoded as an I frame; or if the frame sequence numbers are different, the image is encoded as a P frame.

Descriptions are provided below by using an example.

The frame sequence number of the second I frame in the first image stream that is obtained by using the foregoing method is P(5), and it is determined whether the frame sequence number of the to-be-encoded image in the first image stream is P(5). If the frame sequence number is P(5), the image is encoded as an I frame.

In another possible implementation, on a basis of obtaining the timestamp of the I frame in the first image stream, it is determined whether a timestamp of the to-be-encoded image in the first image stream is the same as the timestamp of the I frame. If the timestamps are the same, the image is encoded as an I frame; or if the timestamps are different, the image is encoded as a P frame. Similarly, it is determined whether a timestamp of a to-be-encoded image in the second image stream is the same as the timestamp of the I frame in the second image stream. If the timestamps are the same, the image is encoded as an I frame; or if the timestamps are different, the image is encoded as a P frame.

Descriptions are provided below by using an example.

The timestamp of the second I frame in the first image stream that is obtained by using the foregoing method is $T1_2$, and it is determined whether the timestamp of the to-be-encoded image in the first image stream is $T1_2$. If the timestamp is $T1_2$, the image is encoded as an I frame.

S807: The remote device sends the first compressed stream and the second compressed stream to the local device.

After receiving the compressed stream of each image stream, the local device decodes the compressed stream of each image stream to obtain each decoded image stream. A time for transmitting the two compressed streams to the local device is short, which resolves the delay problem caused by a long transmission time of a plurality of image streams. In addition, I frames of the image streams are not concurrent, which can avoid picture jitter caused by concurrent I frames. In addition, compared with the embodiment shown in FIG. 5, the method does not increase a delay from the remote device to the local device, thereby improving user experience.

Figure 8:
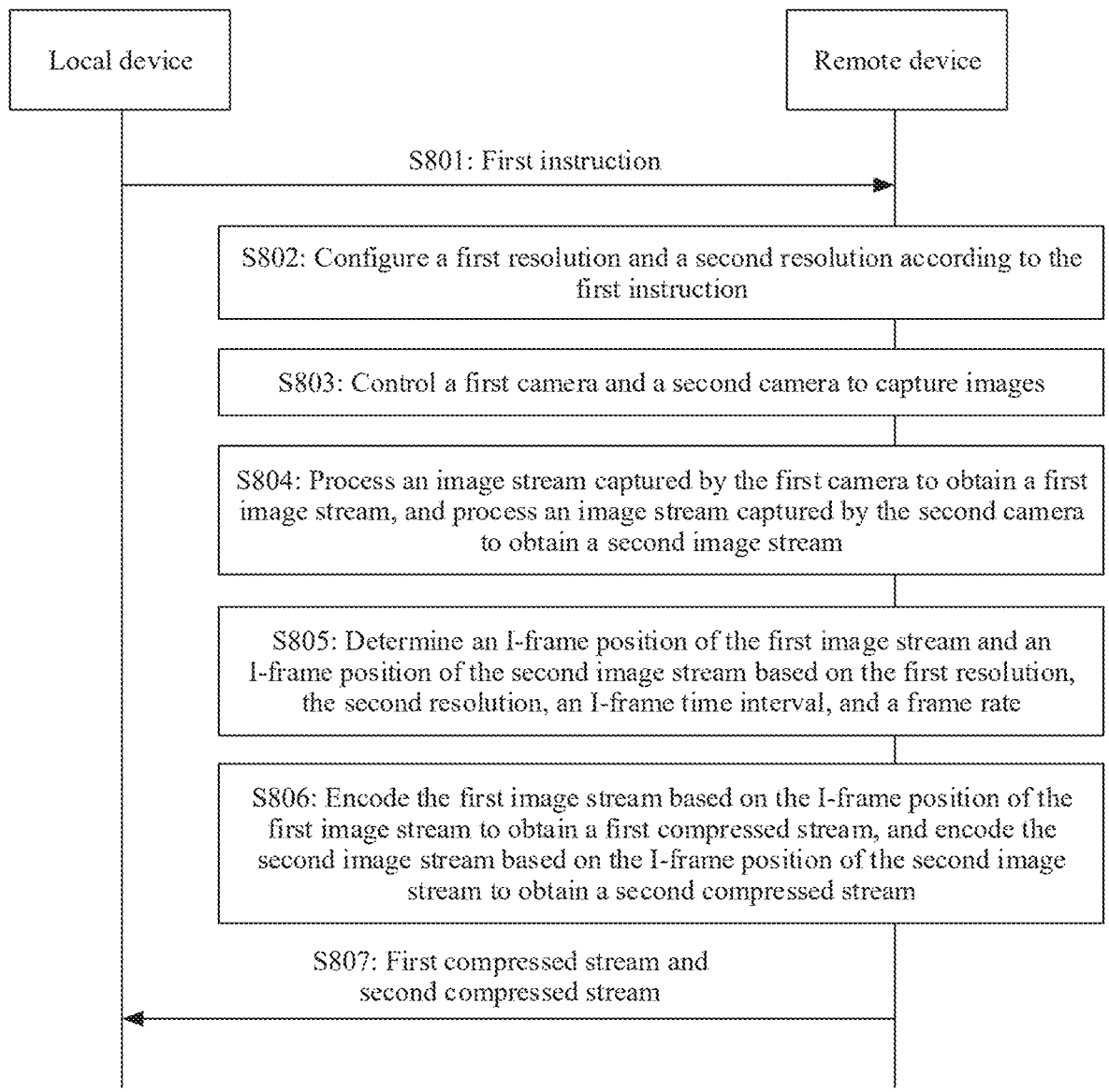
FIG. 8 is an interaction diagram 1 in a scenario shown in FIG. 3 according to an embodiment of this application.
Figure 11:
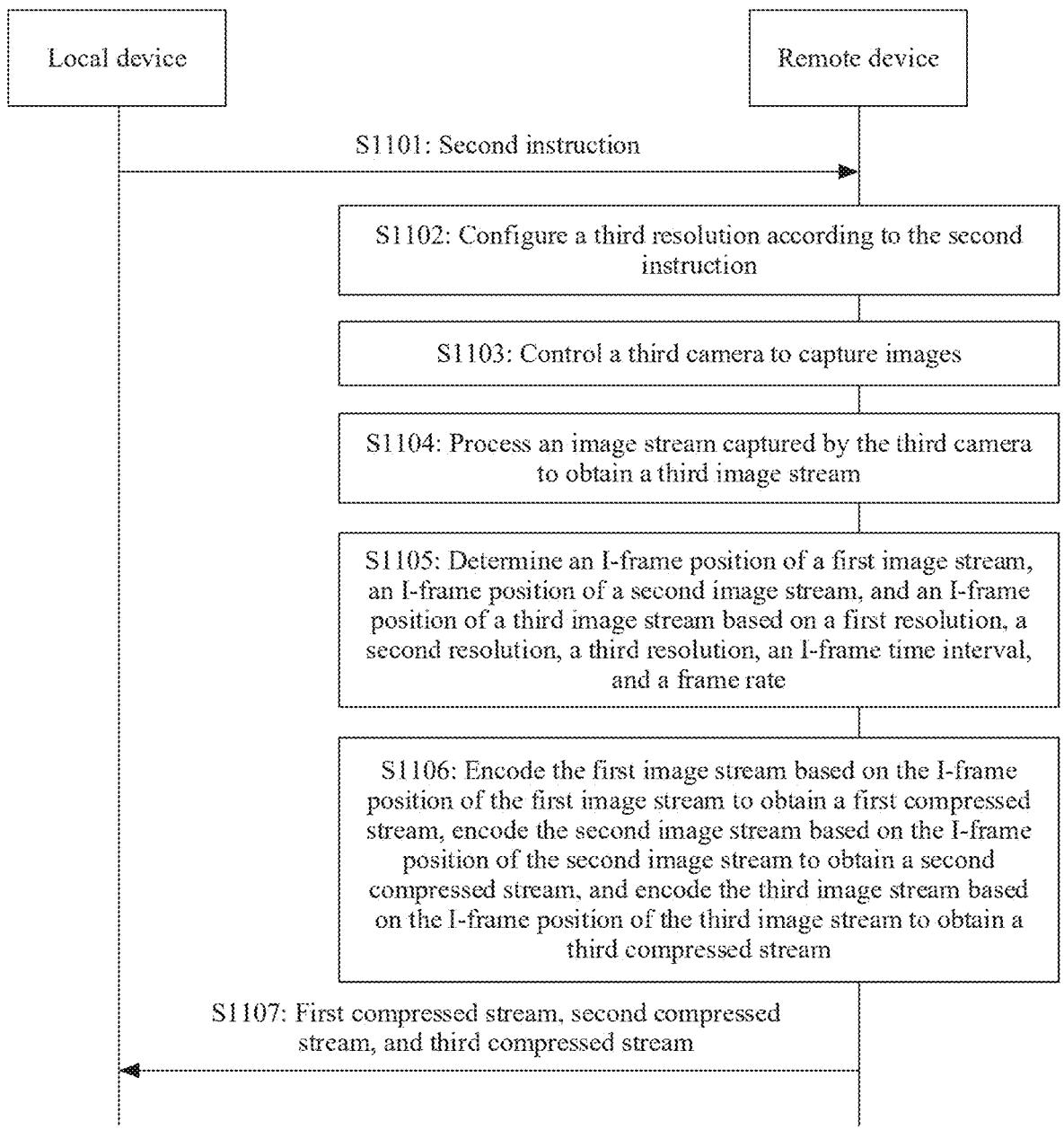
FIG. 11 is an interaction diagram 2 in a scenario shown in FIG. 3 according to an embodiment of this application.

For scenario 2, on the basis that the local device has controlled, by using the embodiment shown in FIG. 8, the first camera and the second camera to capture images, when the local device also needs to control the third camera on the remote device to capture images, the user may trigger a second instruction. For an interaction process between the local device and the remote device, refer to FIG. 11. The interaction process specifically includes the following steps.

S1101: The local device sends the second instruction to the remote device, where the second instruction may carry a third resolution, and the second instruction is used to adjust a resolution parameter value corresponding to the third camera in an ISP module.

S1102: The remote device configures a third resolution according to the second instruction.

The remote device may adjust the resolution parameter value corresponding to the third camera in the ISP module to the third resolution.

S1103: The remote device controls the third camera to capture images.

S1104: The remote device processes an image stream captured by the third camera to obtain a third image stream.

The ISP module may process the image stream captured by the third camera. Because the resolution parameter value corresponding to the third camera in the ISP module is adjusted to the third resolution in S1102, the resolution of the third image stream obtained through ISP processing is the third resolution.

For example, the third resolution is 1280×720, and the third camera is a long-focus camera. After receiving the second instruction, the remote device adjusts the resolution parameter value corresponding to the long-focus camera in the ISP module to 1280×720. After the adjustment, the resolution of the third image stream obtained by the ISP module through processing is 1280×720.

It should be noted that S1103 may be performed before S1102, or S1103 and S1102 may be simultaneously performed. An execution sequence of the two steps is not limited in this embodiment of this application.

S1105: The remote device determines an I-frame position of the first image stream an I-frame position of the second image stream and an I-frame position of the third image stream based on a first resolution, a second resolution, the third resolution, an I-frame time interval, and a frame rate.

Because the third image stream is added, the I-frame position of each image stream needs to be re-determined. The following describes a process of re-determining the I-frame position of each image stream.

As described above, the I-frame position may be represented by a frame sequence number, or may be represented by a timestamp. The following describes an implementation of re-determining the frame sequence number of the I frame.

First, the frame sequence numbers of the images captured by the first camera and the second camera when the third camera captures the first frame of image may be updated to the frame sequence number of the first frame of image. Then, the frame sequence number of the first frame of image in the first image stream is used as the frame sequence number of the first I frame in the first image stream, the frame sequence number of the first frame of image in the second image stream is used as the frame sequence number of the first I frame in the second image stream, and the frame sequence number of the first frame of image in the third image stream is used as the frame sequence number of the first I frame in the third image stream. Then, the I-frame position weight of the first image stream, the I-frame position weight of the second image stream, and the I-frame position weight of the third image stream are determined based on the first resolution, the second resolution, and the third resolution. Finally, a frame sequence number of an $n^{th}$ I frame in the first image stream, a frame sequence number of an $n^{th}$ frame in the image stream, and a frame sequence number of an $n^{th}$ I frame in the image stream are determined based on the I-frame position weight of the first image stream, the I-frame position weight of the second image stream, the I-frame position weight of the third image stream, the I-frame time interval, and the frame rate, where n is greater than or equal to 2.

Descriptions are provided below by using an example.

It is assumed that the first camera is a wide-angle camera, the second camera is a primary camera, and the third camera is a long-focus camera, and it is assumed that when the long-focus camera captures the first frame of image, the wide-angle camera and the primary camera capture the $100^{th}$ frame of image. A frame sequence number of the $100^{th}$ frame of image may be updated to P(1), and then the frame sequence number of the I frame in each image stream is determined by using the method in S805.

The following describes an implementation of re-determining the timestamp of the I frame.

The timestamps of the images captured by the first camera and the second camera when the third camera captures the first frame of image may be updated to T(1), and then the timestamp of the I frame in each image stream is determined by using the method in S805. For details, refer to the foregoing descriptions. Details are not described herein again in this embodiment of this application.

S1106: The remote device encodes the first image stream based on the I-frame position of the first image stream to obtain a first compressed stream, encodes the second image stream based on the I-frame position of the second image stream to obtain a second compressed stream, and encodes the third image stream based on the I-frame position of the third image stream to obtain a third compressed stream.

For a process in which the remote device encodes each image stream, refer to S806 in the embodiment shown in FIG. 8. Details are not described in this embodiment of this application again.

S1107: The remote device sends the first compressed stream, the second compressed stream, and the third compressed stream to the local device.

After receiving the compressed stream of each image stream, the local device decodes the compressed stream of each image stream to obtain each decoded image stream. In the foregoing encoding and decoding method, the local device may control more cameras to capture images, and the remote device may use the method in S805 to re-determine the I-frame position of each image stream, thereby avoiding the picture jitter problem caused by concurrent I frames.

Figure 12:
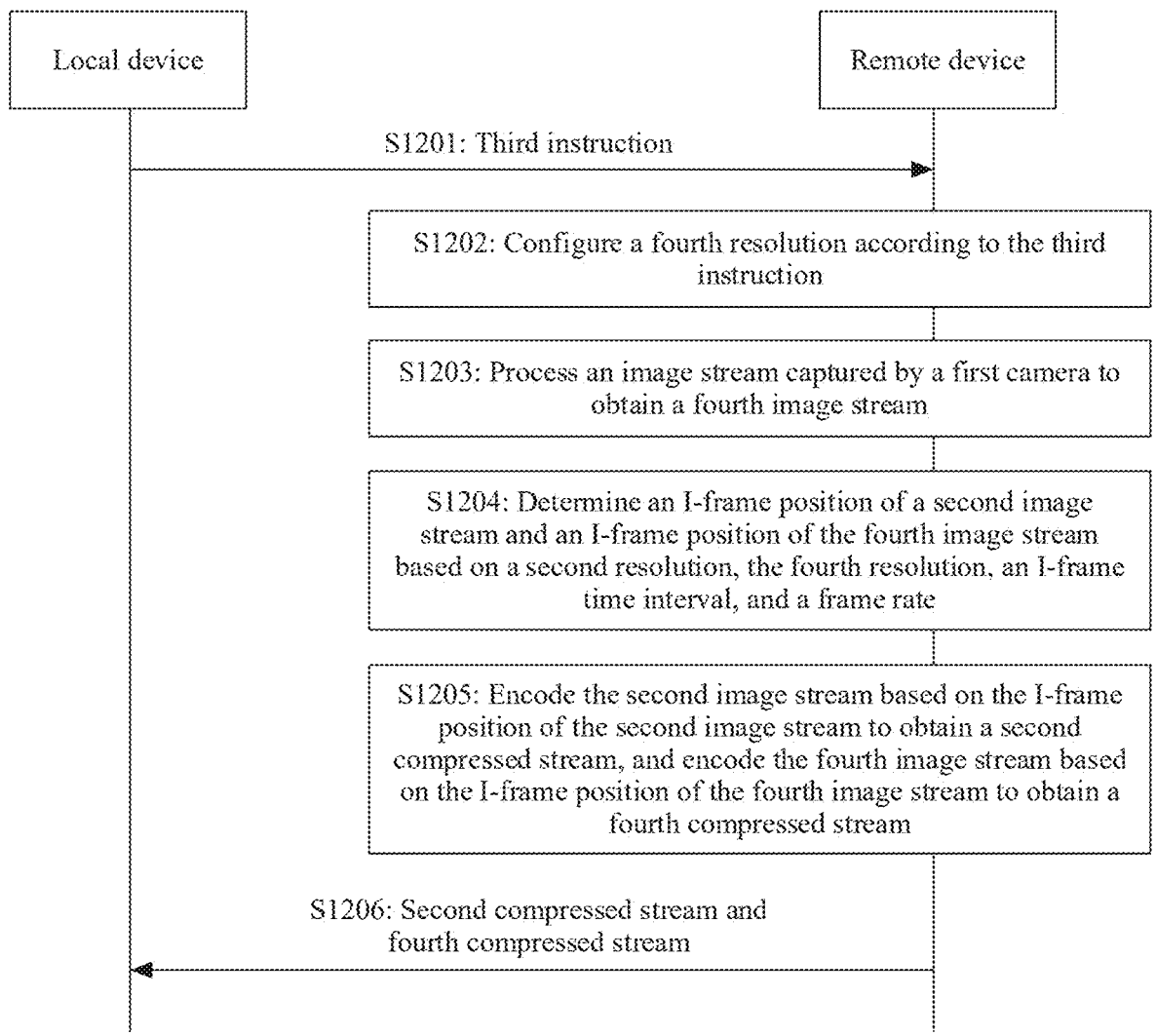
FIG. 12 is an interaction diagram 3 in a scenario shown in FIG. 3 according to an embodiment of this application.

For scenario 3, on the basis that the local device controls, by using the embodiment shown in FIG. 8, the first camera and the second camera to capture images, when the user needs to change a resolution of one image stream, the user may trigger a third instruction. As shown in FIG. 12, a process of interaction between the local device and the remote device specifically includes the following steps.

S1201: The local device sends a third instruction to the remote device, where the third instruction may carry a fourth resolution, and the third instruction is used to adjust a resolution parameter value corresponding to a first camera in an ISP module.

S1202: The remote device configures the fourth resolution according to the third instruction.

The remote device may adjust the resolution parameter value corresponding to the first camera in the ISP module to the fourth resolution.

S1203: The remote device processes an image stream captured by the first camera to obtain a fourth image stream.

The ISP module may process the image stream captured by the first camera. Because the resolution parameter value corresponding to the first camera in the ISP module is adjusted to the fourth resolution in S1202, the resolution of the fourth image stream obtained through ISP processing is the fourth resolution.

For example, a first resolution is 1920×1080, and the first camera is a wide-angle camera. When the user needs to change the resolution of the image stream corresponding to the wide-angle camera output by the ISP module, the third instruction may be triggered. The fourth resolution carried in the third instruction is, for example, 2048×1080. After receiving the third instruction, the remote device adjusts a resolution parameter value corresponding to the wide-angle camera in the ISP module to 2048×1080. After the adjustment, the resolution of the fourth image stream obtained by the ISP module through processing is 2048×1080.

S1204: The remote device determines an I-frame position of the second image stream and an I-frame position of the fourth image stream based on a second resolution, the fourth resolution, an I-frame time interval, and a frame rate.

Because the resolution of the image stream corresponding to the first camera output by the ISP module changes from the first resolution to the fourth resolution, the I-frame position of each image stream needs to be re-determined. The following describes a process of re-determining the I-frame position of each image stream.

As described above, the I-frame position may be represented by a frame sequence number, or may be represented by a timestamp. The following describes an implementation of re-determining the frame sequence number of the I frame.

First, when the third instruction is received, the frame sequence numbers of the images captured by the first camera and the second camera may be updated to the frame sequence number of the first frame of image; then the frame sequence number of the first frame of image in the second image stream is used as the frame sequence number of the first I frame in the second image stream and the frame sequence number of the first frame of image in the fourth image stream is used as the frame sequence number of the first I frame in the fourth image stream, then the I-frame position weight of the second image stream and the I-frame position weight of the fourth image stream are determined based on the second resolution and the fourth resolution; and finally, the frame sequence number of the $n^{th}$ I frame in the second image stream and the frame sequence number of the $n^{th}$ I frame in the fourth image stream are determined based on the I-frame position weight of the second image stream, the I-frame position weight of the fourth image stream, the I-frame time interval, and the frame rate, where n is greater than or equal to 2.

Descriptions are provided below by using an example.

It is assumed that the first camera is a wide-angle camera, and the second camera is a primary camera. When the remote device receives the third instruction, the wide-angle camera and the primary camera capture the $100^{th}$ frame of image. A frame sequence number of the $100^{th}$ frame of image may be updated to P(1), and then the frame sequence number of the I frame in each image stream is determined by using the method in S805.

The following describes an implementation of re-determining the timestamp of the I frame.

The timestamps of the images captured by the first camera and the second camera when the third instruction is received may be updated to T(1), and then the timestamp of the I frame in each image stream is determined by using the method in S805. For details, refer to the foregoing descriptions. Details are not described herein again in this embodiment of this application.

S1205: The remote device encodes the second image stream based on the I-frame position of the second image stream to obtain a second compressed stream, and encodes the fourth image stream based on the I-frame position of the fourth image stream to obtain a fourth compressed stream.

For a process in which the remote device encodes each image stream, refer to S806 in the embodiment shown in FIG. 8. Details are not described in this embodiment of this application again.

S1206: The remote device sends the second compressed stream and the fourth compressed stream to the local device.

After receiving the compressed stream of each image stream, the local device decodes the compressed stream of each image stream to obtain each decoded image stream. In the foregoing encoding and decoding method, the local device may control the remote device to reconfigure the resolution, and determine the I-frame position by using the method in S805, thereby avoiding the picture jitter problem caused by concurrent I frames.

Figure 13:
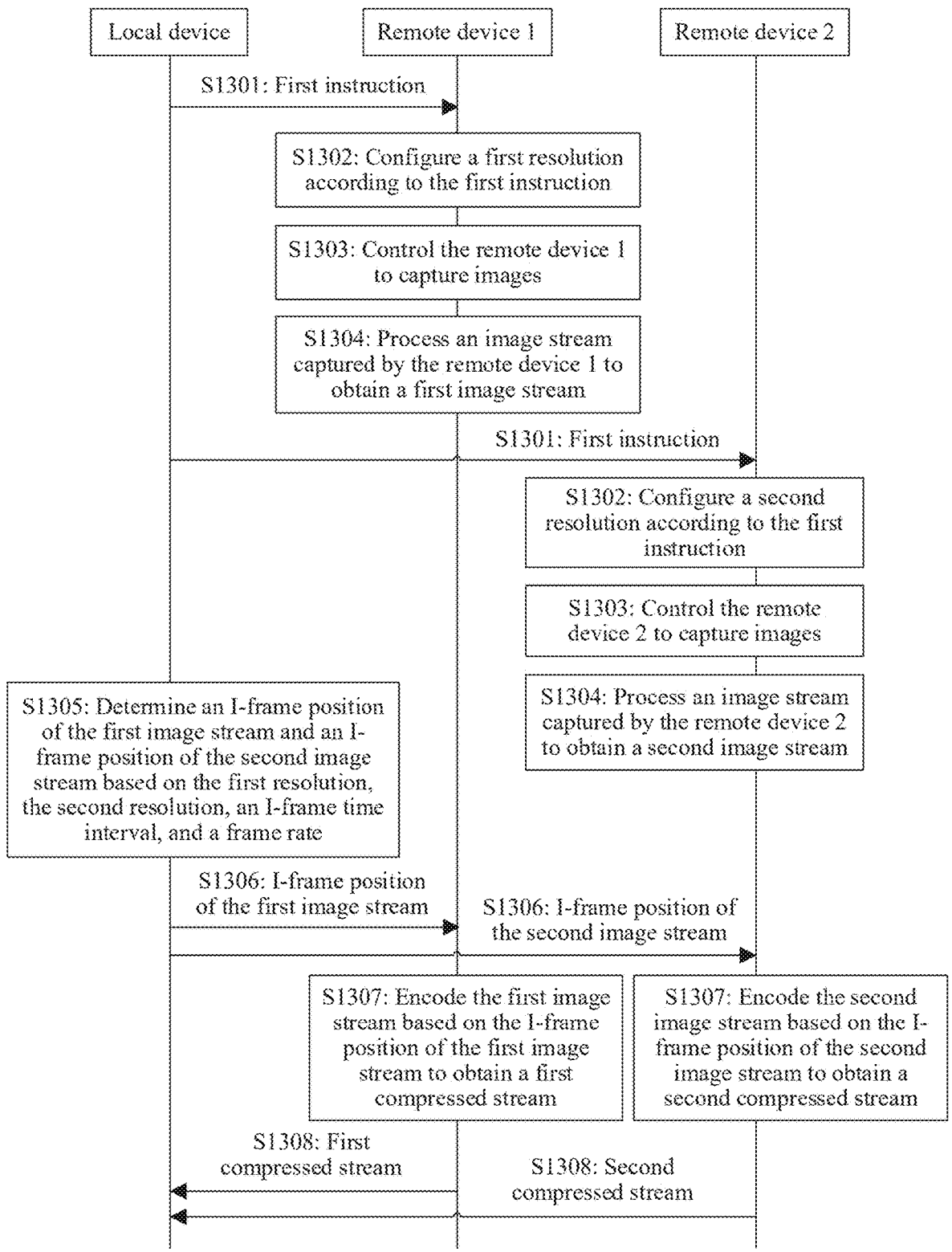
FIG. 13 is an interaction diagram in a scenario shown in FIG. 4 according to an embodiment of this application.

In the scenario shown in FIG. 4, a user may control, by triggering a first instruction, a remote device 1 and a remote device 2 to capture images. For an interaction process of the local device, the remote device 1, and the remote device 2, refer to FIG. 13, and the interaction process specifically includes the following steps:

S1301: The local device separately sends a first instruction to the remote device 1 and the remote device 2.

The first instruction sent by the local device to the remote device 1 carries a first resolution, and the first instruction is used to adjust the resolution parameter value in the remote device 1. The first instruction sent by the local device to the remote device 2 carries a second resolution, and the first instruction is used to adjust the resolution parameter value in the remote device 2.

S1302: The remote device 1 configures the first resolution according to the first instruction, and the remote device 2 configures the second resolution according to the first instruction.

The remote device 1 may adjust the resolution parameter value in the ISP module to the first resolution. The remote device 2 may adjust the resolution parameter value in the ISP module to the second resolution.

S1303: The remote device 1 controls the remote device 1 to capture images, and the remote device 2 controls the remote device 2 to capture images.

S1304: The remote device 1 processes an image stream captured by the remote device 1 to obtain a first image stream, and the remote device 2 processes an image stream captured by the remote device 2 to obtain a second image stream.

The ISP module in the remote device 1 may process the image stream captured by the remote device 1. Because in S1302, the remote device 1 adjusts the resolution parameter value in the ISP module to the first resolution, the resolution of the first image stream obtained by the ISP module through processing is the first resolution. The ISP module in the remote device 2 may process the image stream captured by the remote device 2. Because in S1302, the remote device 2 adjusts the resolution parameter value in the ISP module to the second resolution, the resolution of the second image stream obtained by the ISP module through processing is the second resolution.

For example, the first resolution is 2048×1080, and the second resolution is 1920×1080. After receiving the first instruction, the remote device 1 adjusts the resolution parameter value in the ISP module to 2048×1080. After the adjustment, the resolution of the first image stream output by the ISP module is 2048×1080. After receiving the first instruction, the remote device 2 adjusts the resolution parameter value in the ISP module to 1920×1080. After the adjustment, the resolution of the second image stream output by the ISP module is 1920×1080.

S1305: The local device determines an I-frame position of the first image stream and an I-frame position of the second image stream based on the first resolution, the second resolution, an I-frame time interval, and a frame rate.

Figure 14:
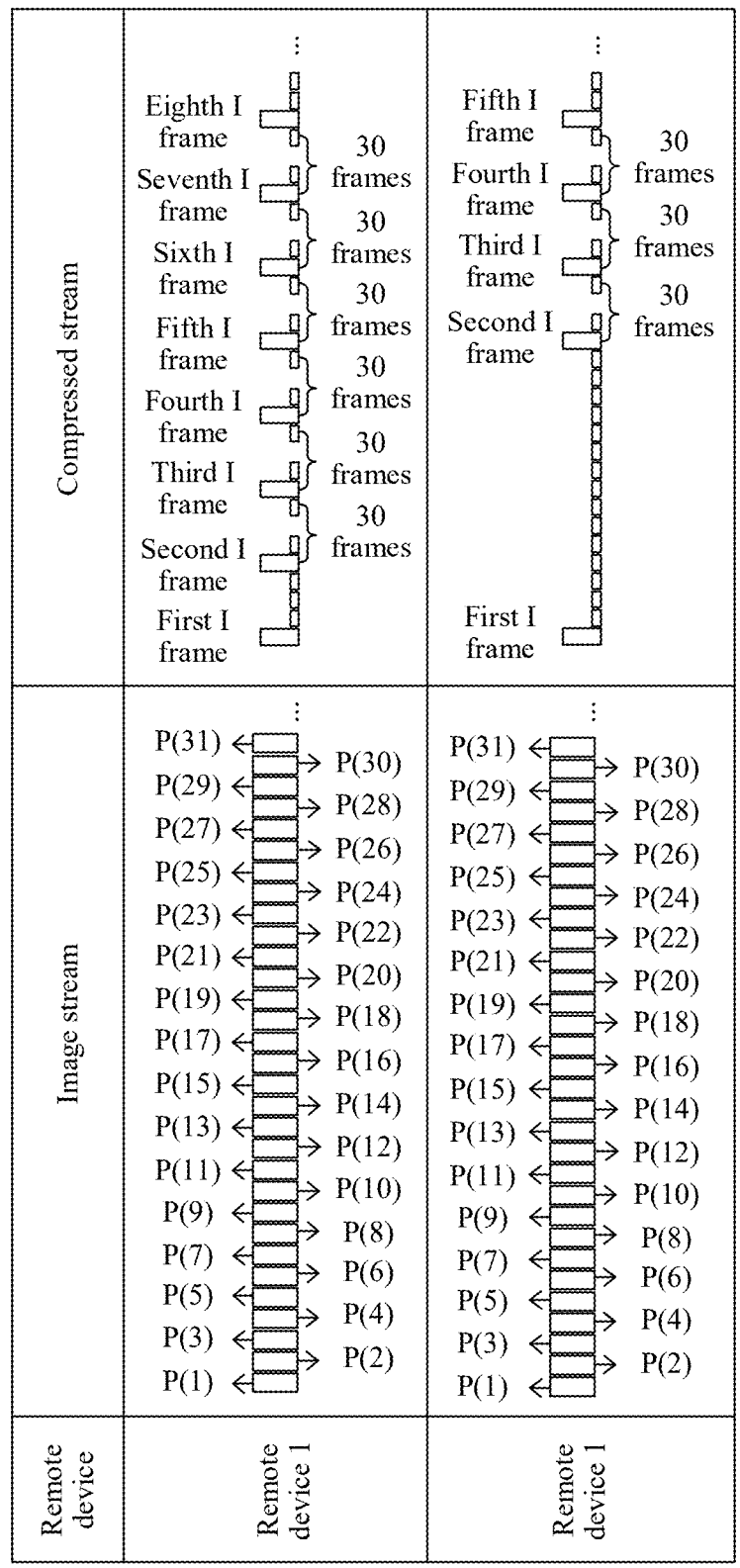
FIG. 14 is a diagram of distribution of I frames in the scenario shown in FIG. 4 according to an embodiment of this application.

For a specific implementation of determining the I-frame position, refer to S805 in the embodiment shown in FIG. 8. Details are not described in this embodiment of this application again. It should be noted that, as shown in FIG. 14, the I-frames that are in each image stream and that are obtained through calculation in S805 are evenly distributed, so that picture jitter caused by concurrent I-frames can be avoided.

S1306: The local device sends the I-frame position of the first image stream to the remote device 1, and sends the I-frame position of the second image stream to the remote device 2.

S1307: The remote device 1 encodes the first image stream based on the I-frame position of the first image stream to obtain a first compressed stream, and the remote device 2 encodes the second image stream based on the I-frame position of the second image stream to obtain a second compressed stream.

In a possible implementation, if the I-frame position received by the remote device 1 is a frame sequence number of the I frame, it is determined whether a frame sequence number of a to-be-encoded image is the same as the frame sequence number. If the frame sequence numbers are the same, the image is encoded as an I frame; or if the frame sequence numbers are different, the image is encoded as a P frame. Similarly, if the I-frame position received by the remote device 2 is the frame sequence number of the I frame, it is determined whether the frame sequence number of the to-be-encoded image is the same as the frame sequence number. If the frame sequence numbers are the same, the image is encoded as an I frame; or if the frame sequence numbers are different, the image is encoded as a P frame.

Descriptions are provided below by using an example.

The second I frame is used as an example. With reference to the scenario shown in FIG. 4, if the frame sequence number of the second I frame received by the remote device 1 is P(5), the remote device 1 determines whether the frame sequence number of the to-be-encoded image is P(5). If the frame sequence number is P(5), the image is encoded as an I frame; or if the frame sequence number is not P(5), the image is encoded as a P frame.

In another possible implementation, if the I-frame position received by the remote device 1 is the timestamp of the I frame, it is determined whether the timestamp of the to-be-encoded image is the same as the timestamp. If the timestamps are the same, the image is encoded as an I frame; or if the timestamps are different, the image is encoded as a P frame. Similarly, if the I-frame position received by the remote device 2 is the timestamp of the I frame, it is determined whether the timestamp of the to-be-encoded image is the same as the timestamp. If the timestamps are the same, the image is encoded as an I frame; or if the timestamps are different, the image is encoded as a P frame.

The second I frame is used as an example. With reference to the scenario shown in FIG. 4, if the timestamp of the second I frame received by the remote device 1 is $T1_2$, it is determined whether the timestamp of the to-be-encoded image is $T1_2$. If the timestamp is $T1_2$, the image is encoded as an I frame; or if the timestamp is not $T1_2$, the image is encoded as a P frame.

S1308: The remote device 1 sends the first compressed stream to the local device, and the remote device 2 sends the second compressed stream to the local device.

Because the remote device 1 compresses the first image stream, and the remote device 2 compresses the second image stream, a data amount of the two obtained compressed streams is far less than a data amount of the corresponding image streams, a time used for transmitting the two compressed streams to the local device is relatively short, and after receiving the two compressed streams, the local device decodes the two compressed streams to obtain corresponding image streams, thereby resolving a delay problem caused by a long transmission time of the plurality of image streams. In addition, the local device calculates I-frame positions of the two image streams based on resolutions, and sends the I-frame positions of the two image streams to corresponding devices, so that the remote device 1 generates I frames at corresponding positions based on the received I-frame positions, and the remote device 2 generates I frames at corresponding positions based on the received I-frame positions. Because the I frames in each of the two image streams are evenly distributed, the picture jitter problem caused by an instantaneous increase in the data amount when the I frames are concurrent can be avoided.

Figure 15:
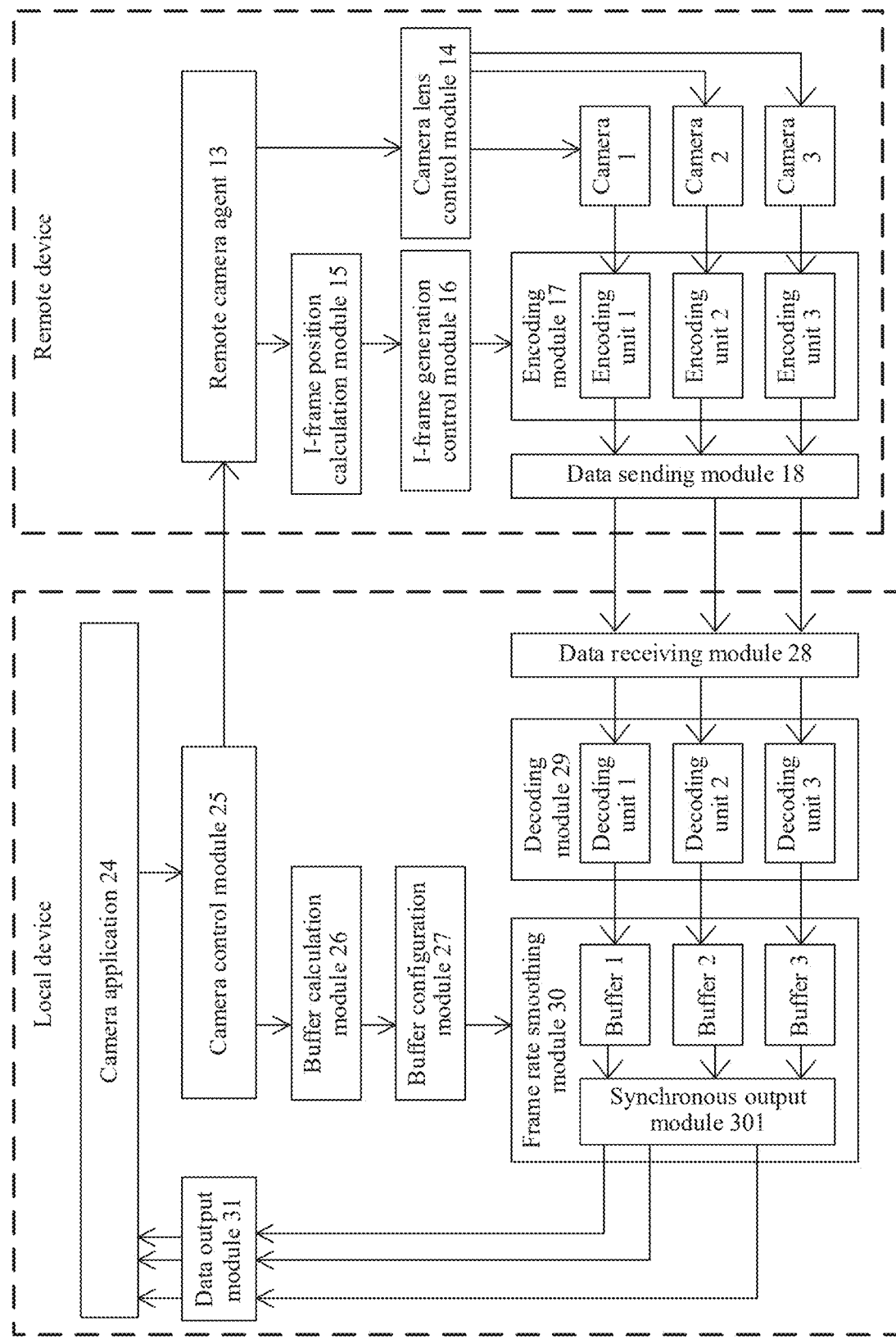
FIG. 15 is a diagram 1 of a software framework in a scenario shown in FIG. 3 according to an embodiment of this application.

In the scenario shown in FIG. 3, FIG. 15 is a software framework diagram 1 according to an embodiment of this application. Refer to FIG. 15. A remote device includes but is not limited to a remote camera agent 13, a camera lens control module 14, an I-frame position calculation module 15, an I frame generation control module 16, an encoding module 17, and a data sending module 18. The encoding module 17 includes a plurality of encoding units; and in FIG. 13, the encoding units 1 to 3 are used as an example. The remote device further includes a plurality of cameras; and in FIG. 15, the cameras 1 to 3 are used as an example.

The local device includes but is not limited to: a camera application 24, a camera control module 25, a buffer calculation module 26, a buffer configuration module 27, a data receiving module 28, a decoding module 29, a frame rate smoothing module 30, and a data output module 31. The decoding module 29 includes a plurality of decoding units; and in FIG. 15, the decoding units 1 to 3 are used as an example. The frame rate smoothing module 30 includes a plurality of buffers and a synchronous output module 301; and in FIG. 15, the buffers 1 to 3 are used as an example.

To obtain a plurality of image streams by using a plurality of cameras of the remote device, a user may trigger a first instruction on the camera application 24. The camera application 24 sends the first instruction to the camera control module 25. The camera control module 25 sends the first instruction to the remote camera agent 13, and then the remote camera agent 13 sends the first instruction to the camera lens control module 14. The camera lens control module 14 configures a first resolution and a second resolution according to the first instruction, and controls the first camera and the second camera to capture images, where the first camera and the second camera may be any two of the cameras 1 to 3. An ISP module processes an image stream captured by the first camera to obtain a first image stream, and processes an image stream captured by the second camera to obtain a second image stream.

The camera application 24, the camera control module 25, the remote camera agent 13, and the camera lens control module 14 are further configured to transfer the second instruction and the third instruction. For a transfer process, refer to the first instruction. Details are not described herein again in this embodiment of this application.

The I-frame position calculation module 15 may be configured to determine an I-frame position of the first image stream and an I-frame position of the second image stream based on the first resolution, the second resolution, an I-frame time interval, and a frame rate, and send the I-frame position of each image stream to the I frame generation control module 16. The I frame generation control module 16 is configured to send an I frame generation request to each encoding unit in the encoding module 17. Each encoding unit in the encoding module 17 is configured to encode the first image stream based on the I-frame position of the first image stream to obtain a first compressed stream, encode the second image stream based on the I-frame position of the second image stream to obtain a second compressed stream, and send each compressed stream to the data sending module 18.

The data receiving module 28 in the local device is configured to receive the compressed stream of each image stream, and send the compressed stream of each image stream to the decoding module 29. Decoding units in the decoding module 29 are configured to decode the compressed streams to obtain decoded images, and store the decoded images to buffers. The buffer calculation module 26 is configured to determine a buffer size based on an expected maximum jitter time and the frame rate. For example, if the expected maximum jitter time is 100 ms and the frame rate is 30 frames/s, the buffer size may be 100 ms/(1 s/(30 frames/s))≈space occupied by three frames of image. For another example, if the expected maximum jitter time is 100 ms and the frame rate is 60 frames/s, the buffer size is 100 ms/(1 s/(60 frames/s))≈space occupied by six frames of image. The buffer configuration module 27 is configured to configure buffers 1 to 3 in the frame rate smoothing module 30 based on the buffer size determined by the buffer calculation module 26. The synchronous output module 301 is configured to obtain the images from the buffers 1 to 3, and send the obtained images to the data output module 31. The synchronous output module 301 may ensure that the decoded image streams are output at a same frame interval. The data output module 31 may send the image streams to the camera application 24, and the camera application 24 may be used to display the image streams.

Figure 16:
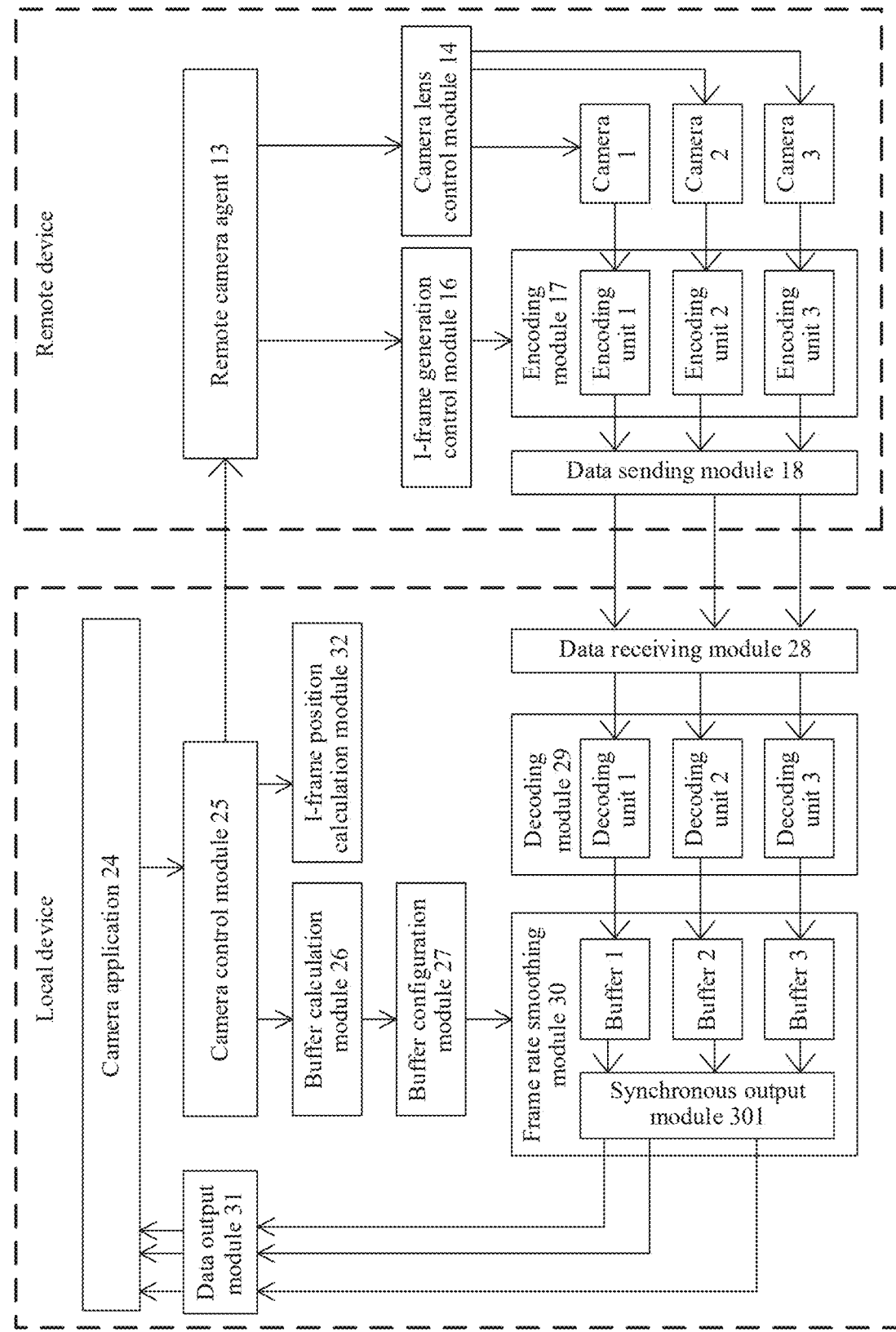
FIG. 16 is a diagram 2 of a software framework in a scenario shown in FIG. 3 according to an embodiment of this application.

In the scenario shown in FIG. 3, FIG. 16 is a software framework diagram 2 according to an embodiment of this application. Different from the architecture shown in FIG. 15, in FIG. 16, an I-frame position calculation module 15 is not disposed in a remote device, but an I-frame position calculation module 32 is designed in a local device. The I-frame position calculation module 32 is configured to determine an I-frame position of a first image stream and an I-frame position of a second image stream based on a first resolution, a second resolution, an I-frame time interval, and a frame rate, and send the I-frame position of each image stream to the I frame generation control module 16 in the remote device. Functions of other software modules in FIG. 16 are similar to those in FIG. 15. Details are not described in this embodiment of this application again.

Figure 17:
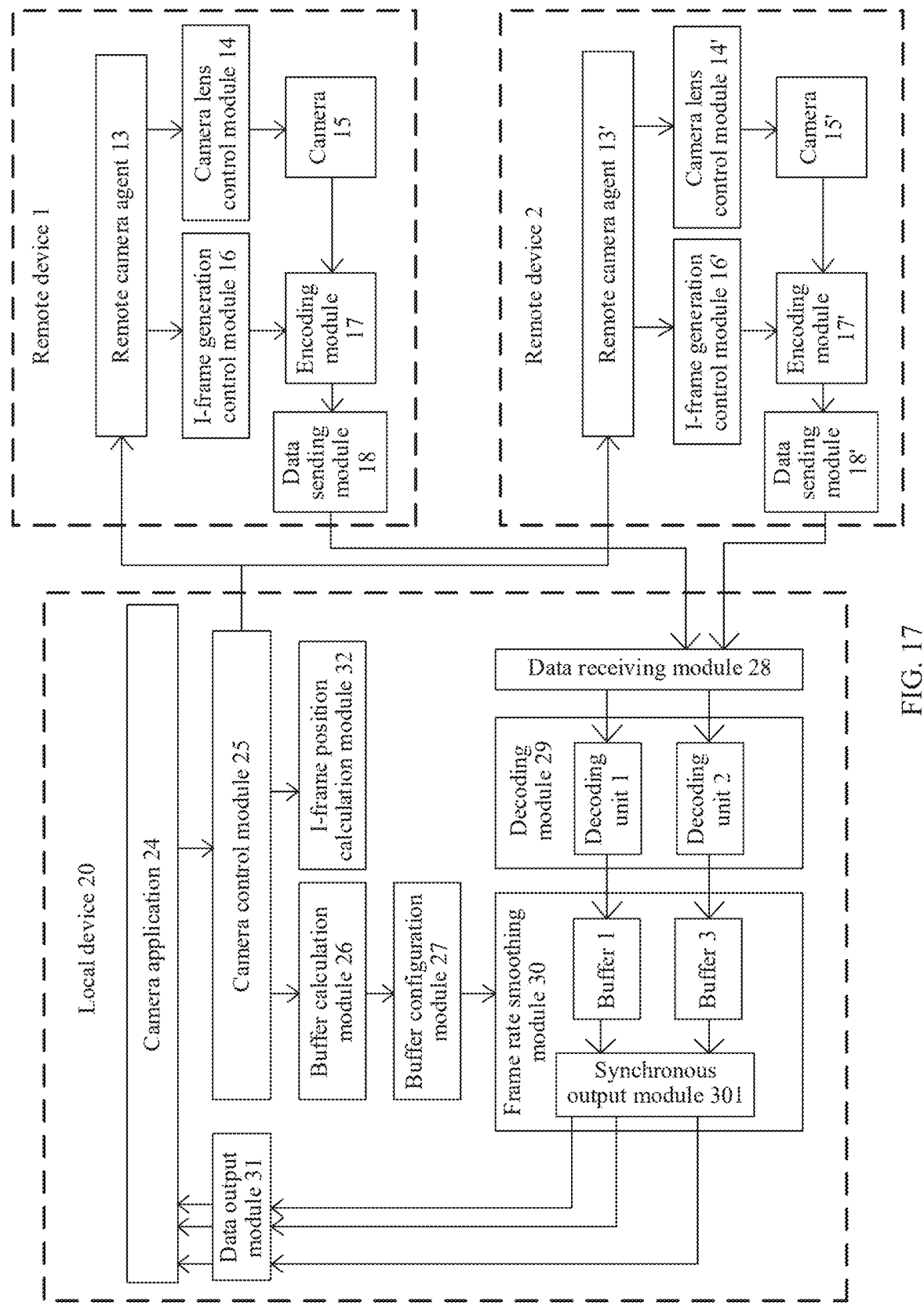
FIG. 17 is a diagram of a software framework in a scenario shown in FIG. 4 according to an embodiment of this application.

In the scenario shown in FIG. 4, FIG. 17 is a software framework diagram according to an embodiment of this application. Refer to FIG. 17. A remote device 1 includes but is not limited to a remote camera agent 13, a camera lens control module 14, a camera 15, an I frame generation control module 16, an encoding module 17, and a data sending module 18. The remote device 2 includes but is not limited to: a remote camera agent 13', a camera lens control module 14', a camera 15', an I frame generation control module 16', an encoding module 17', and a data sending module 18'.

The local device includes hut is not limited to: a camera application 24, a camera control module 25, a buffer calculation module 26, a buffer configuration module 27, a data receiving module 28, a decoding module 29, a frame rate smoothing module 30, a data output module 31, and an I-frame position calculation module 32. The decoding module 29 includes a plurality of decoding units; and in FIG. 14, the decoding units 1 and 2 are used as an example. The frame rate smoothing module 30 includes a plurality of buffers and a synchronous output module 301; and in FIG. 14, the buffers 1 and 2 are used as an example.

To obtain a plurality of image streams by using a plurality of remote devices, using the remote device 1 as an example, a user may trigger a first instruction on the camera application 24. The camera application 24 sends the first instruction to the camera control module 25. The camera control module 25 sends the first instruction to the remote camera agent 13. The remote camera agent 13 sends the first instruction to the camera lens control module 14. The camera lens control module 14 configures the first resolution according to the first instruction, and controls the remote device 1 to capture images. An ISP module processes an image stream captured by the remote device 1 to obtain a first image stream. A processing process of the remote device 2 is similar, and details are not described herein in this embodiment of this application.

The I-frame position calculation module 32 is configured to determine an I-frame position of the first image stream and an I-frame position of the second image stream according to the first resolution, the second resolution, the I frame time interval, and the frame rate, and send the I-frame position of the first image stream to the I frame generation control module 16 by using the camera control module 25 and the remote camera agent 13. The I frame generation control module 16 is configured to send an I frame generation request to the encoding module 17. The encoding module 17 is configured to send an I-frame position of the first image stream, encode the first image stream to obtain a first compressed stream, and send the first compressed stream to the data sending module 18. The camera control module 25 and the remote camera agent 13' send the I-frame position of the second image stream to the I frame generation control module 16'. The I frame generation control module 16' is configured to send an I frame generation request to the encoding module 17'. The encoding module 17' is configured to encode the second image stream based on the I-frame position of the second image stream to obtain a second compressed stream, and send the second compressed stream to the data sending module 18.

The data receiving module 28 in the local device is configured to receive the compressed stream sent by each remote device, and send the compressed stream to the decoding module 29. Decoding units in the decoding module 29 are configured to decode the compressed streams to obtain decoded images, and store the decoded images to buffers. The buffer calculation module 26 is configured to determine a buffer size based on an expected maximum jitter time and the frame rate. The buffer configuration module 27 is configured to configure buffers 1 and 2 in the frame rate smoothing module 30 based on the buffer size determined by the buffer calculation module 26. The synchronous output module 301 is configured to obtain the images from the buffers 1 and 2, and send the obtained images to the data output module 31. The synchronous output module 301 may ensure that the decoded image streams are output at a same frame interval. The data output module 31 may send the image streams to the camera application 24, and the camera application 24 may be used to display the image streams.

In a possible implementation, the local device may display the plurality of image streams in a left-right split screen manner, or may display the plurality of image streams in a top-down split screen manner. A manner of displaying the plurality of camera streams by the local device is not limited in this application.

Figure 18:
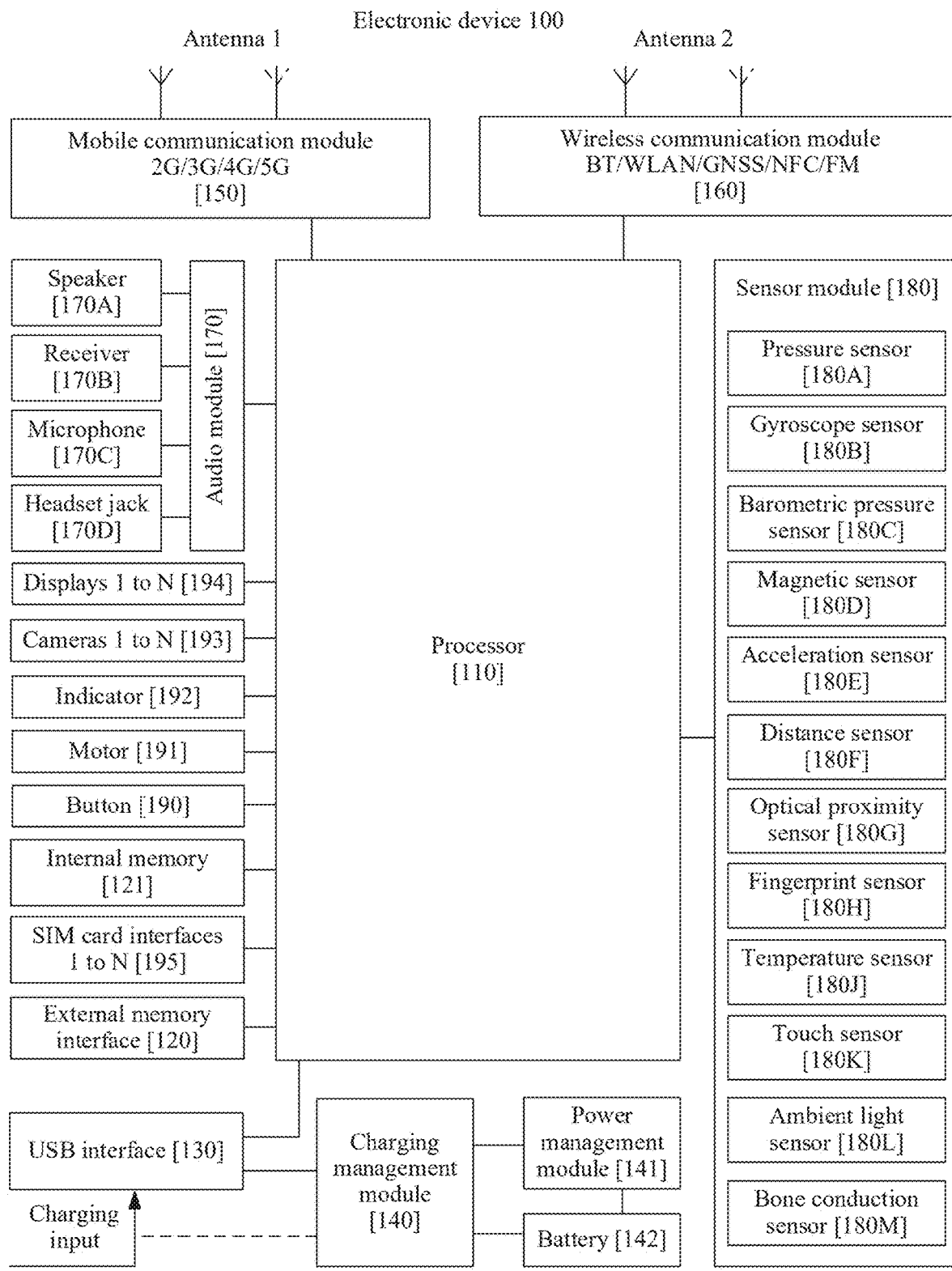
FIG. 18 is a schematic diagram of a structure of an electronic device 100 according to an embodiment of this application.

FIG. 18 is a schematic diagram of a structure of an electronic device 100. Both a remote device and a local device may use the structure shown in FIG. 18. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B a microphone 170C, a headset jack 170D, a sensor 180, a button 190, a motor 191, an indicator 192, a camera 193, a display 194, a subscriber identification module (subscriber identification module, SIM) card interface 195, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The video codec is configured to compress or decompress a digital video. The electronic device 100 may support one or more video codecs. In this way, the electronic device 100 may play back or record videos in a plurality of encoding formats, such as moving picture experts group (moving picture experts group, MPEG)-1, MPEG-2, MPEG-3, and MPEG-4.

When the electronic device shown in FIG. 18 is the remote device in the scenario shown in FIG. 3, the video codec includes the encoding units 1 to 3 in FIG. 15 or FIG. 16. When the electronic device shown in FIG. 18 is the local device in the scenario shown in FIG. 3, the video codec includes the decoding units 1 to 3 in FIG. 15 or FIG. 16. When the electronic device shown in FIG. 18 is the remote device 1 in the scenario shown in FIG. 4, the video codec includes the encoding module 17 in FIG. 17. When the electronic device shown in FIG. 18 is the remote device 2 in the scenario shown in FIG. 4, the video codec includes the encoding module 17' in FIG. 17. When the electronic device shown in FIG. 18 is the local device in the scenario shown in FIG. 4, the video codec includes the decoding unit 1-2 in FIG. 17.

When the electronic device shown in FIG. 18 is the remote device in the scenario shown in FIG. 3, the camera 193 includes the cameras 1 to 3 in FIG. 15 or FIG. 16. When the electronic device shown in FIG. 18 is the remote device in the scenario shown in FIG. 4, the video codec includes the camera 15 in FIG. 17.

Figure 19:
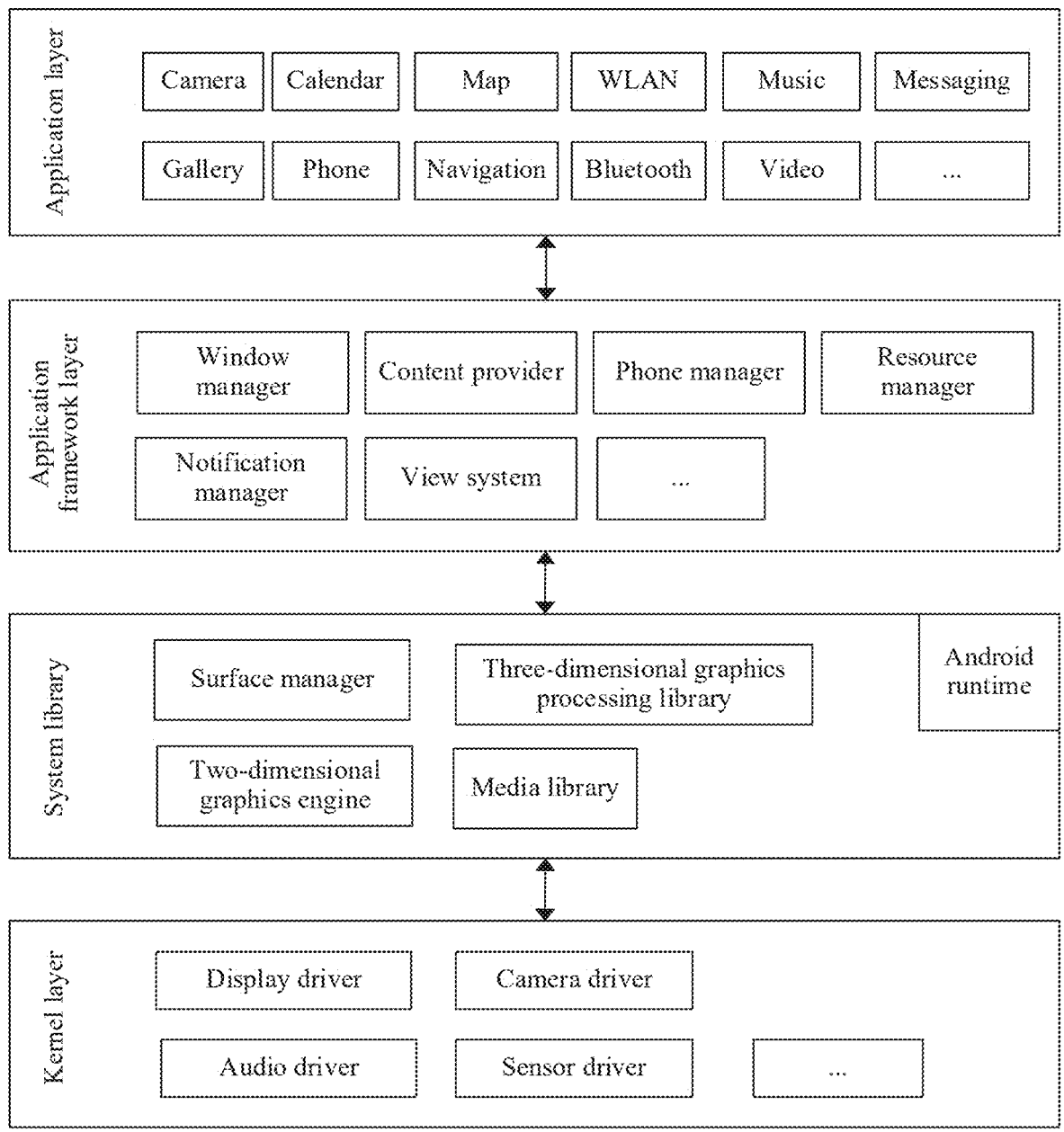
FIG. 19 is a diagram of a software framework of an electronic device 100 according to an embodiment of this application.

Refer to FIG. 19. In some embodiments, software of the electronic device 100 may be divided into four layers: an application layer, an application framework layer, an Android runtime (Android runtime), and a system library from top to bottom. The layers communicate with each other by using a software interface.

The application layer may include a series of application packages.

As shown in FIG. 19, the application packages may include applications such as Camera, Gallery, Calendar, Phone, Map, Navigation, WLAN, Bluetooth, Music, Video, and Messaging.

When the electronic device shown in FIG. 18 is the remote device in the scenario shown in FIG. 3 or FIG. 4, the application package may further include a remote camera agent. When the electronic device shown in FIG. 18 is the local device in the scenario shown in FIG. 3 or FIG. 4, the application package may further include a camera application.

The application framework layer provides an application programming interface (application programming interface, API) and a programming framework for an application at the application layer. The application framework layer includes some predefined functions.

As shown in FIG. 19, the application framework layer may include a window manager, a content provider, a view system, a phone manager, a resource manager, a notification manager, and the like.

The window manager is configured to manage a window program. The window manager may obtain a display size, determine whether there is a status bar, lock a screen, take a screenshot, and the like.

The content provider is used to store and obtain data, and enables these data to be accessible to an application. The data may include videos, images, audio, calls that are made and answered, browsing histories and bookmarks, a phone book, and the like.

The view system includes visual controls such as a control for displaying a text and a control for displaying a picture. The view system may be configured to construct an application. A display interface may include one or more views. For example, a display interface including a short message notification icon may include a text display view and a picture display view.

The phone manager is configured to provide a communication function for the electronic device 100, for example, management of a call status (including answering, hanging up, or the like).

The resource manager provides various resources for an application such as a localized character string, an icon, a picture, a layout file, and a video file.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an alert sound is played, the electronic device vibrates, or the indicator light blinks.

The Android runtime includes a core library and a virtual machine. The Android runtime is responsible for scheduling and management of the Android system.

The core library includes two parts: one part is a function that needs to be invoked by a Java language, and the other part is a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, such as a surface manager (surface manager), a media library (Media Libraries), a three-dimensional graphics processing library (for example, OpenGL ES), a 2D graphics engine (for example, SGL), and a system server module (SurfaceFlinger).

The surface manager is configured to manage a display subsystem, and provide fusion of 2D and 3D layers for a plurality of applications.

The media library supports playback and recording in a plurality of commonly used audio and video formats, static image files, and the like. The media libraries may support a variety of audio and video encoding formats, such as MPEG4, H.264, MP3, AAC, AMR, JPG, PNG, and the like.

The three-dimensional graphics processing library is configured to implement three-dimensional graphics drawing, image rendering, composition, layer processing, and the like.

The 2D graphics engine is a graphics engine for 2D graphics.

The kernel layer is a layer between hardware and software. The kernel layer includes at least a display driver, a camera driver, an audio driver, and a sensor driver.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, implemented by a first device, wherein the method comprises:
receiving, from a second device, a first instruction;
configuring a first resolution and a second resolution according to the first instruction;
controlling a first camera and a second camera of the first device to capture images;
processing first images captured by the first camera to obtain a first image stream, wherein the first image stream comprises the first resolution;
processing second images captured by the second camera to obtain a second image stream, wherein the second image stream comprises the second resolution;
encoding the first image stream based on a first I-frame position of the first image stream to obtain a first compressed stream;
encoding the second image stream based on a second I-frame position of the second image stream to obtain a second compressed stream, wherein the first I-frame position of the first image stream and the second I-frame position of the second image stream is based on the first resolution, the second resolution, an I-frame time interval, and a frame rate, wherein the I-frame time interval is based on a current network bandwidth, a first bandwidth threshold, and a second bandwidth threshold, and wherein the first bandwidth threshold is greater than the second bandwidth threshold;
using, by the first device and when the current network bandwidth is greater than or equal to the first bandwidth threshold, a first preset interval as the I-frame time interval;
identifying, by the first device and when the current network bandwidth is greater than the second bandwidth threshold and less than the first bandwidth threshold, the I-frame time interval based on the current network bandwidth, the first bandwidth threshold, the second bandwidth threshold, the first preset interval, and a second preset interval, wherein the second preset interval is greater than the first preset interval; and
sending the first compressed stream and the second compressed stream to the second device.

2. The method of claim 1, wherein an I-frame position is a frame sequence number of an I-frame, and wherein the method further comprises:
using a first frame sequence number of a first frame of image in the first image stream as a second frame sequence number of a first I-frame in the first image stream;
using a third frame sequence number of a second frame of image in the second image stream as a fourth frame sequence number of a second I-frame in the second image stream; and
identifying a fifth frame sequence number of a first $n^{th}$ I-frame in the first image stream and a sixth frame sequence number of a second $n^{th}$ I-frame in the second image stream based on a first I-frame position weight of the first image stream, a second I-frame position weight of the second image stream, the I-frame time interval, and the frame rate, wherein n is greater than or equal to 2, and wherein the first I-frame position weight and the second I-frame position weight are based on the first resolution and the second resolution.

3. The method of claim 2, further comprising:
identifying a seventh frame sequence number of a third I-frame in the first image stream;
identifying an eighth frame sequence number of a fourth I-frame in the second image stream based on the first I-frame position weight, the second I-frame position weight, the seventh frame sequence number, the I-frame time interval, and the frame rate;
identifying a ninth frame sequence number of a first $m^{th}$ I-frame in the first image stream based on the seventh frame sequence number, the I-frame time interval, and the frame rate, wherein m is greater than or equal to 3; and
identifying a tenth frame sequence number of a second $m^{th}$ I-frame in the second image stream based on the eighth frame sequence number, the I-frame time interval, and the frame rate, wherein m is greater than or equal to 3.

4. The method of claim 2, wherein the first I-frame position weight is based on a formula $$W_1 = \frac{S_1}{S_1 + S_2},$$

wherein $W_1$ is the first I-frame position weight, $S_1$ is the first resolution, and $S_2$ is the second resolution, wherein the second I-frame position weight is based on a formula $$W_2 = \frac{S_2}{S_1 + S_2},$$

and wherein $W_2$ is the second I-frame position weight, $S_1$ is the first resolution, and $S_2$ is the second resolution.

5. The method of claim 3, wherein the eighth frame sequence number is based on a formula $P_2=P_1+(W_1+W_2)*INR*Fps/2$, and wherein $P_2$ is the eighth frame sequence number, $P_1$ is the seventh frame sequence number, $W_1$ is the first I-frame position weight, $W_2$ is the second I-frame position weight, INR is the I-frame time interval, and Fps is the frame rate.

6. The method of claim 3, wherein the ninth frame sequence number is based on a formula $P_m=P_{m-1}+INR*Fps$, wherein $P_m$ is the ninth frame sequence number, $P_{m-1}$ is a frame sequence number of an $(m-1)^{th}$ I-frame in the first image stream, INR is the I-frame time interval, and Fps is the frame rate, wherein the tenth frame sequence number is based on a formula $P'_m=P'_{m-1}+INR*Fps$, and wherein $P'_m$ is the tenth frame sequence number, $P'_{m-1}$ is an eleventh frame sequence number of an $(m-1)^{th}$ I-frame in the second image stream, INR is the I-frame time interval, and Fps is the frame rate.

7. The method of claim 1, wherein the I-frame time interval is based on a formula $INR=INR_{normal}+(INR_{max}-INR_{normal})*(BW-TH_2)/(TH_1-TH_2)$, and wherein INR is the I-frame time interval, $INR_{normal}$ is the first preset interval, $INR_{max}$ the second preset interval, BW is the current network bandwidth, $TH_1$ is the first bandwidth threshold, and $TH_2$ is the second bandwidth threshold.

8. The method of claim 1, wherein an I-frame position is a timestamp of an I-frame, and wherein the method further comprises:
   identifying a first frame sequence number of a first I-frame in the first image stream and a second frame sequence number of a second I-frame in the second image stream based on the first resolution, the second resolution, the I-frame time interval, and the frame rate;
   identifying a first timestamp of the first I-frame based on the first frame sequence number, a second timestamp of a first frame of image in the first image stream, and the frame rate; and
   identifying a third timestamp of the second I-frame based on the second frame sequence number, a fourth timestamp of the first frame of image in the second image stream, and the frame rate.

9. The method of claim 1, wherein the method further comprises:
   receiving a second instruction;
   configuring a third resolution according to the second instruction;
   controlling a third camera of the first device to capture images;
   processing third images captured by the third camera to obtain a third image stream, wherein the third image stream comprises the third resolution; and
   identifying a third I-frame position of the first image stream, a fourth I-frame position of the second image stream, and a fifth I-frame position of the third image stream based on the first resolution, the second resolution, the third resolution, the I-frame time interval, and the frame rate.

10. The method of claim 9, wherein the identifying the third I-frame position, the fourth I-frame position, and the fifth I-frame position comprises:
   updating frame sequence numbers of images captured by the first camera and the second camera to a first frame sequence number of a first frame of image when the third camera captures the first frame of image;
   using the first frame sequence number in the first image stream as a second frame sequence number of a first I-frame in the first image stream;
   using a third frame sequence number of the first frame of image in the second image stream as a fourth frame sequence number of a second I-frame in the second image stream; and
   using a fifth frame sequence number as a sixth frame sequence number of a third I-frame in the third image stream;
   identifying a first I-frame position weight of the first image stream, a second I-frame position weight of the second image stream, and a third I-frame position weight of the third image stream based on the first resolution, the second resolution, and the third resolution; and
   identifying a seventh frame sequence number of a first $n^{th}$ I-frame in the first image stream, an eighth frame sequence number of a second $n^{th}$ I-frame in the second image stream, and a ninth frame sequence number of a third $n^{th}$ I-frame in the third image stream based on the first I-frame position weight, the second I-frame position weight, the third I-frame position weight, the I-frame time interval, and the frame rate, wherein n is greater than or equal to 2.

11. The method of claim 1, wherein the method further comprises:
   receiving, from the second device, a third instruction;
   configuring a fourth resolution according to the third instruction;
   processing fourth images captured by the first camera to obtain a fourth image stream, wherein the fourth image stream comprises the fourth resolution; and
   identifying the second I-frame position and a third I-frame position of the fourth image stream based on the second resolution, the fourth resolution, the I-frame time interval, and the frame rate.

12. The method of claim 11, wherein the identifying the second I-frame position and the third I-frame position comprises:
   updating frame sequence numbers of images captured by the first camera and the second camera to a first frame sequence number of a first frame of image when the third instruction is received;
   using the first frame sequence number of a second frame of image in the second image stream as a second frame sequence number of a first I-frame in the second image stream;
   using a third frame sequence number of a third frame of image in the fourth image stream as a fourth frame sequence number of a second I-frame in the fourth image stream;
   identifying a first I-frame position weight of the second image stream and a second I-frame position weight of the fourth image stream based on the second resolution and the fourth resolution; and
   identifying a fifth frame sequence number of a first $n^{th}$ I-frame in the second image stream and a sixth frame sequence number of a second $n^{th}$ I-frame in the fourth image stream based on the first I-frame position weight, the second I-frame position weight, the I-frame time interval, and the frame rate, wherein n is greater than or equal to 2.

13. An encoding method, implemented by a communication system, wherein the method comprises:
- separately sending, by a third device of the communication system, a first instruction to a first device and a second device of the communication system;
- configuring, by the first device, a first resolution according to the first instruction by:
  - controlling the first device to capture first images; and
  - processing the first images captured by the first device to obtain a first image stream, wherein the first resolution is of the first image stream;
- configuring, by the second device, a second resolution according to the first instruction by:
  - controlling the second device to capture second images; and
  - processing the second images captured by the second device to obtain a second image stream, wherein the second resolution is of the second image stream;
- identifying, by the third device, a first I-frame position of the first image stream and a second I-frame position of the second image stream based on the first resolution, the second resolution, an I-frame time interval, and a frame rate, wherein an I-frame position is a frame sequence number of an I-frame, and wherein the identifying, by the third device, the first I-frame position and the second I-frame position comprises:
  - using, by the third device, a first frame sequence number of a first frame of image in the first image stream as a second frame sequence number of a first I-frame in the first image stream;
  - using, by the third device, a third frame sequence number of a second frame of image in the second image stream as a fourth frame sequence number of a second I-frame in the second image stream;
  - identifying, by the third device, a first I-frame position weight of the first image stream and a second I-frame position weight of the second image stream based on the first resolution and the second resolution; and
  - identifying, by the third device, a fifth frame sequence number of a first $n^{th}$ I-frame in the first image stream and a sixth frame sequence number of a second $n^{th}$ I-frame in the second image stream based on the first I-frame position weight, the second I-frame position weight, the I-frame time interval, and the frame rate, wherein n is greater than or equal to 2;
- sending the first I-frame position to the first device;
- sending the second I-frame position to the second device;
- encoding, by the first device, the first image stream based on the first I-frame position to obtain a first compressed stream;
- sending the first compressed stream to the third device;
- encoding, by the second device, the second image stream based on the second I-frame position to obtain a second compressed stream; and
- sending the second compressed stream to the third device.

14. The method of claim 13, wherein the identifying the fifth frame sequence number and the sixth frame sequence number comprises:
- identifying, by the third device, a seventh frame sequence number of a third I-frame in the first image stream;
- identifying, by the third device, an eighth frame sequence number of a fourth I-frame in the second image stream based on the first I-frame position weight, the second I-frame position weight, the seventh frame sequence number, the I-frame time interval, and the frame rate;
- identifying, by the third device, a ninth frame sequence number of a first $m^{th}$ I-frame in the first image stream based on the seventh frame sequence number, the I-frame time interval, and the frame rate, wherein m is greater than or equal to 3; and
- identifying, by the third device, a tenth frame sequence number of a second $m^{th}$ I-frame in the second image stream based on the eighth frame sequence number, the I-frame time interval, and the frame rate, wherein m is greater than or equal to 3.

15. The method of claim 13, wherein the identifying the first I-frame position weight and the second I-frame position weight comprises:
- identifying, by the third device, the first I-frame position weight using a formula:

$$W_1 = \frac{S_1}{S_1 + S_2},$$

wherein $W_1$ is the first I-frame position weight, $S_1$ is the first resolution, and $S_2$ is the second resolution; and
- identifying, by the third device, the second I-frame position weight using a formula:

$$W_2 = \frac{S_2}{S_1 + S_2},$$

wherein $W_2$ is the second I-frame position weight, $S_1$ is the first resolution and $S_2$ is the second resolution.

16. The method of claim 14, wherein the identifying the eighth frame sequence number comprises identifying, by the third device, the eighth frame sequence number using a formula: $P_2 = P_1 + (W_1 + W_2)*INR*Fps/2$, and wherein $P_2$ is the eighth frame sequence number, $P_1$ is the seventh frame sequence number, $W_1$ is the first I-frame position weight, $W_2$ is the second I-frame position weight, INR is the I-frame time interval, and Fps is the frame rate.

17. A first device comprising:
- a first camera and a second camera configured to capture images; and
- a processor coupled to the first camera and the second camera and configured to:
  - control the first camera and the second camera to capture the images; and
  - process first images captured by the first camera to obtain a first image stream, wherein the first image stream comprises a first resolution;
  - process second images captured by the second camera to obtain a second image stream, wherein the second image stream comprises a second resolution;
  - identify a first I-frame position of the first image stream and a second I-frame position of the second image stream based on the first resolution, the second resolution, an I-frame time interval, and a frame rate, wherein the I-frame time interval is based on a current network bandwidth, a first bandwidth threshold, and a second bandwidth threshold, and wherein the first bandwidth threshold is greater than the second bandwidth threshold;

use, when the current network bandwidth is greater than or equal to the first bandwidth threshold, a first preset interval as the I-frame time interval;

identify when the current network bandwidth is greater than the second bandwidth threshold and less than the first bandwidth threshold, the I-frame time interval based on the current network bandwidth, the first bandwidth threshold, the second bandwidth threshold, the first preset interval, and a second preset interval, wherein the second preset interval is greater than the first preset interval;

encode the first image stream based on the first I-frame position to obtain a first compressed stream;

encode the second image stream based on the second I-frame position to obtain a second compressed stream; and send the first compressed stream and the second compressed stream to a second device.

18. The first device of claim 17, wherein an I-frame position is a frame sequence number of an I-frame, and wherein the processor is further configured to:

use a first frame sequence number of a first frame of image in the first image stream as a second frame sequence number of a first I-frame in the first image stream;

use a third frame sequence number of a second frame of image in the second image stream as a fourth frame sequence number of a second I-frame in the second image stream; and identify a fifth frame sequence number of a first $n^{th}$ I-frame in the first image stream and a sixth frame sequence number of a second $n^{th}$ I-frame in the second image stream based on a first I-frame position weight of the first image stream, a second I-frame position weight of the second image stream, the I-frame time interval, and the frame rate, wherein n is greater than or equal to 2, and wherein the first I-frame position weight and the second I-frame position weight are based on the first resolution and the second resolution.

19. The first device of claim 18, wherein the processor is further configured to:

identify a seventh frame sequence number of a third I-frame in the first image stream;

identify an eighth frame sequence number of a fourth I-frame in the second image stream based on the first I-frame position weight, the second I-frame position weight, the seventh frame sequence number, the I-frame time interval, and the frame rate;

identify a ninth frame sequence number of a first $m^{th}$ I-frame in the first image stream based on the seventh frame sequence number, the I-frame time interval, and the frame rate, wherein m is greater than or equal to 3; and identify a tenth frame sequence number of a second $m^{th}$ I-frame in the second image stream based on the eighth frame sequence number, the I-frame time interval, and the frame rate, wherein m is greater than or equal to 3.

20. The first device of claim 17, wherein an I-frame position is a timestamp of an I-frame, and wherein the processor is further configured to:

identify a first frame sequence number of a first I-frame in the first image stream and a second frame sequence number of a second I-frame in the second image stream based on the first resolution, the second resolution, the I-frame time interval, and the frame rate;

identify a first timestamp of the first I-frame based on the first frame sequence number, a second timestamp of a first frame of image in the first image stream, and the frame rate; and identify a third timestamp of the second I-frame based on the second frame sequence number, a fourth timestamp of the first frame of image in the second image stream, and the frame rate.

* * * * *